(12) United States Patent
Niwayama

(10) Patent No.: US 10,332,275 B2
(45) Date of Patent: Jun. 25, 2019

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Yutaka Niwayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 424 days.

(21) Appl. No.: 15/087,482

(22) Filed: Mar. 31, 2016

(65) Prior Publication Data

US 2016/0292889 A1   Oct. 6, 2016

(30) Foreign Application Priority Data

Apr. 2, 2015  (JP) .................................. 2015-076076

(51) Int. Cl.
  *G06T 7/73* (2017.01)
  *H04N 13/254* (2018.01)

(52) U.S. Cl.
  CPC .............. *G06T 7/75* (2017.01); *H04N 13/254* (2018.05)

(58) Field of Classification Search
  CPC ............................. G06T 7/75; H04N 13/0253
  See application file for complete search history.

(56) References Cited

U.S. PATENT DOCUMENTS

| | | | |
|---|---|---|---|
| 9,208,395 B2 * | 12/2015 | Fujiki .................. | G01B 11/002 |
| 9,495,750 B2 * | 11/2016 | Miyatani ................ | B25J 9/1697 |
| 2005/0286059 A1 * | 12/2005 | Ellenrieder ............... | G06T 7/80 356/614 |
| 2013/0121592 A1 * | 5/2013 | Fujiki .................. | G01B 11/002 382/195 |

FOREIGN PATENT DOCUMENTS

| | | |
|---|---|---|
| CN | 102401646 A | 4/2012 |
| CN | 103512548 A | 1/2014 |

(Continued)

OTHER PUBLICATIONS

Zhengyou Zhang, "A Flexible New Technique for Camera Calibration," IEEE Transactions on Pattern Analysis and Machine Intelligence, 2000, vol. 22, No. 11, pp. 1330-1334.

(Continued)

*Primary Examiner* — Wesley J Tucker
(74) *Attorney, Agent, or Firm* — Canon U.S.A., Inc. IP Division

(57) ABSTRACT

In order to perform robust position and orientation measurement even in a situation where there are noises, an image, including a measurement target object, captured by an image capturing apparatus is acquired, a flag indicating whether any one of geometric features constituting a three-dimensional model of the measurement target object or a plurality of image features detected from the image corresponds to a shadow of the measurement target object is set, the plurality of geometric features and the plurality of image features detected from the image are associated with each other based on an approximate position and orientation of the measurement target object and the flag, and a position and orientation of the measurement target object is derived based on a result of the association by the association unit.

13 Claims, 15 Drawing Sheets

(56) References Cited

FOREIGN PATENT DOCUMENTS

| CN | 104204728 A | 12/2014 |
|---|---|---|
| JP | 2012-042396 A | 3/2012 |
| JP | 2014-042210 A | 3/2014 |
| WO | 2011/105522 A1 | 9/2011 |

OTHER PUBLICATIONS

Makoto Kimura, et al., "Projector Calibration using Arbitrary Planes and Calibrated Camera," Digital Human Research Center, National Institute of Advanced Industrial Science and Technology, Japan, 2007.

Vincent Lepetit and Pascal Fua, "Keypoint Recognition using Randomized Trees," Ecole Polytechnique Federale de Lausanne (EPFL), Computer Vision Laboratory, I&C Faculty, Aug. 17, 2006, Lausanne, Switzerland.

\* cited by examiner

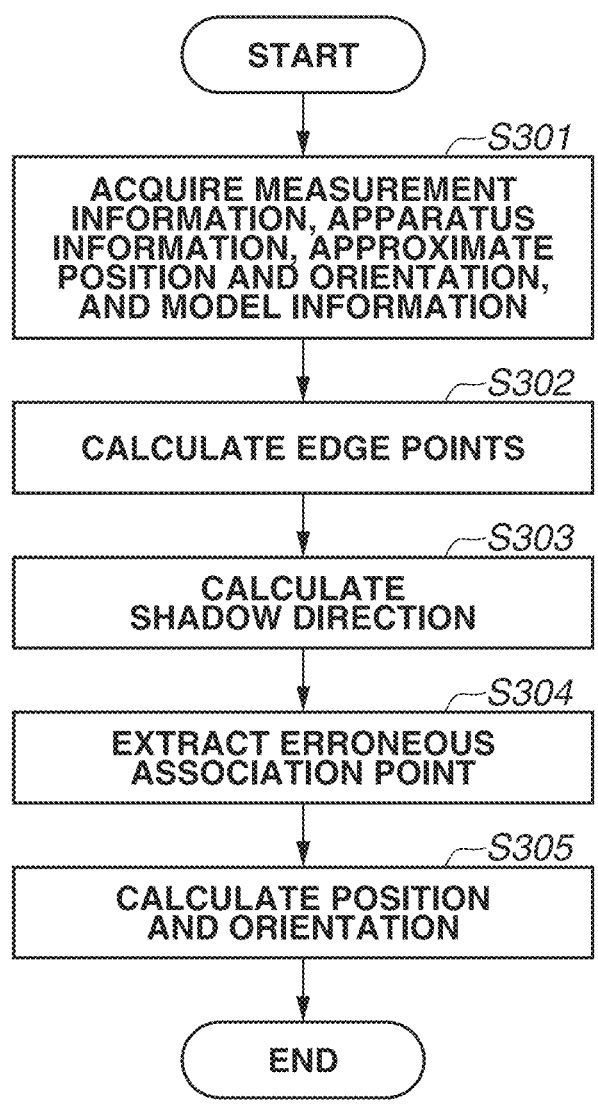

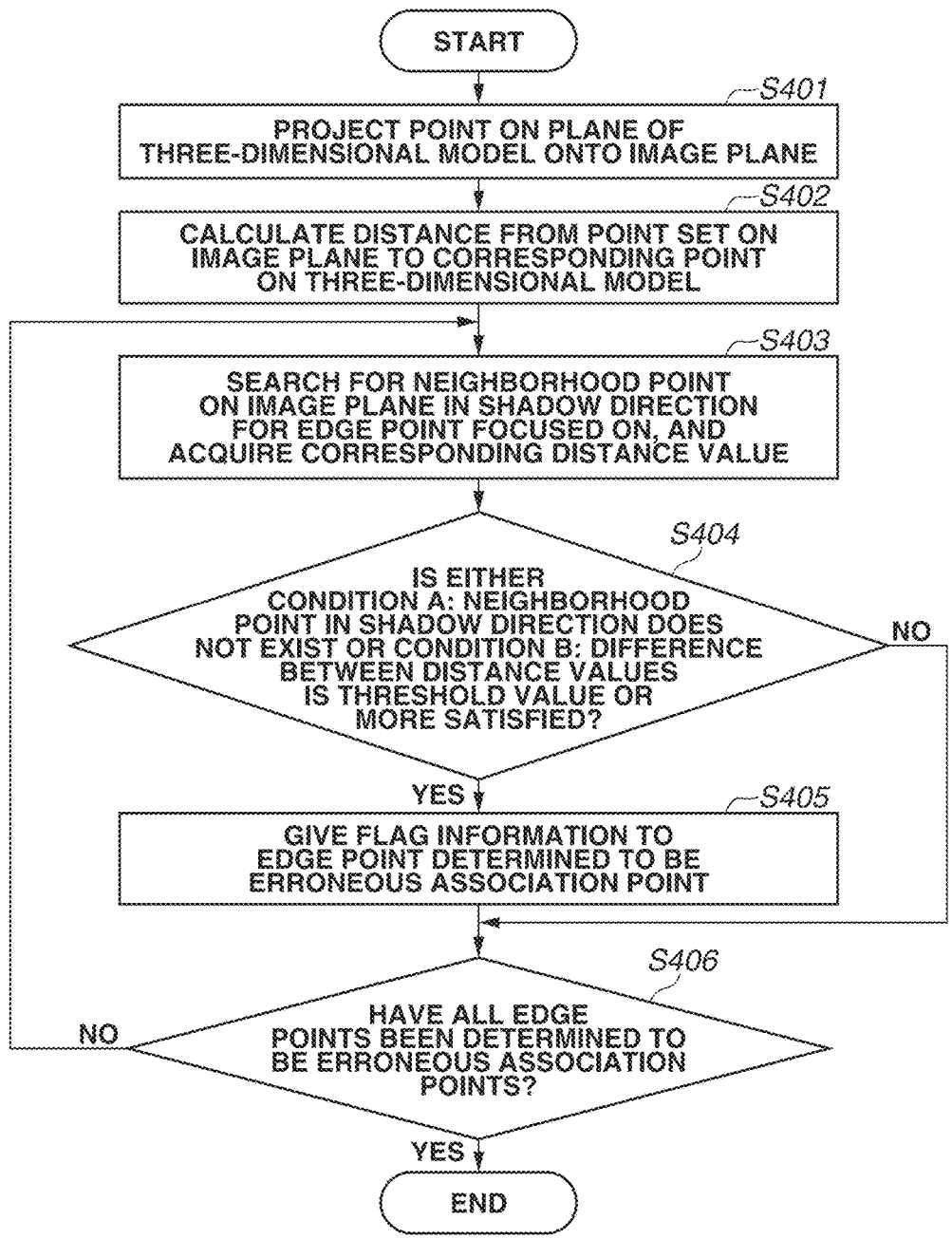

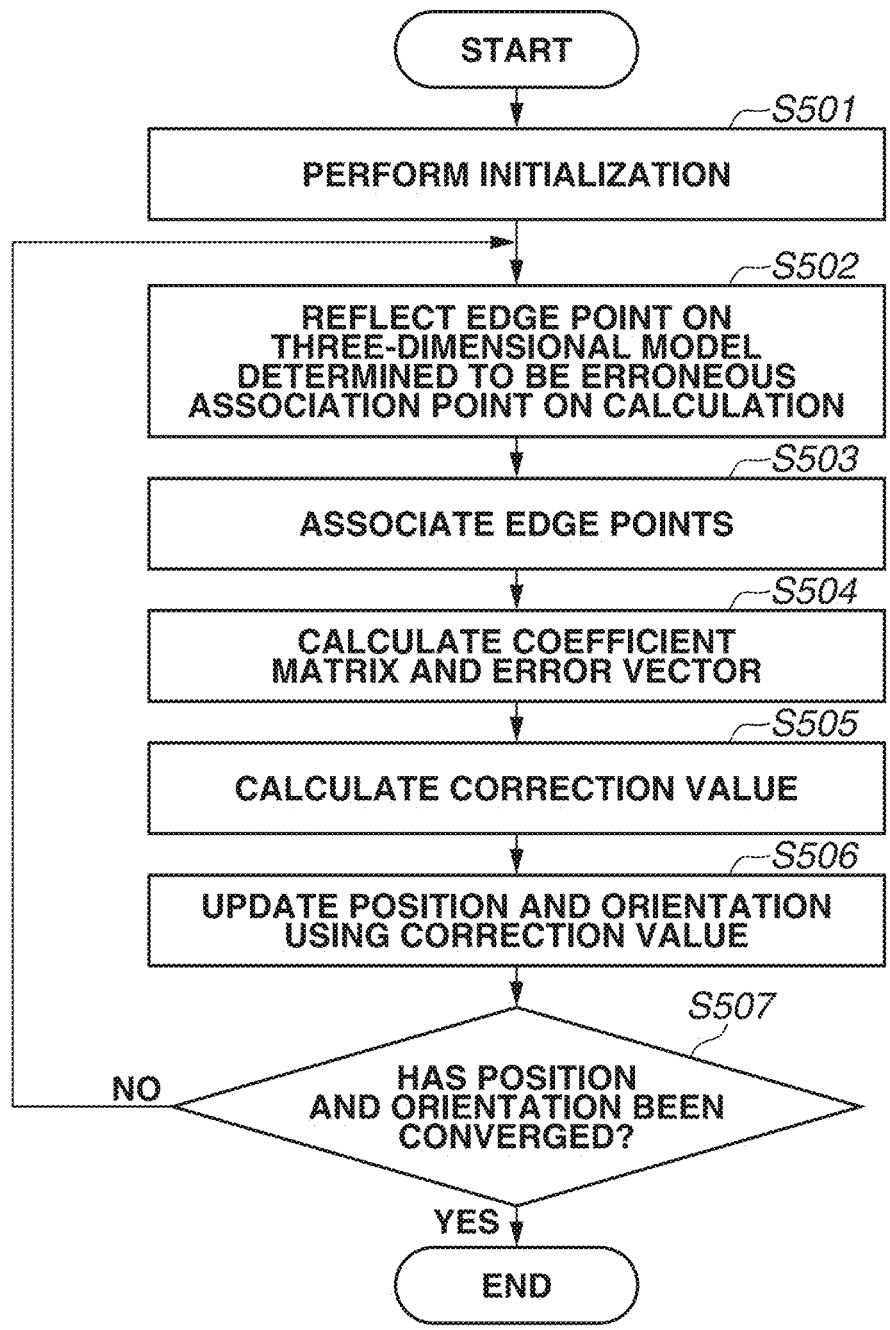

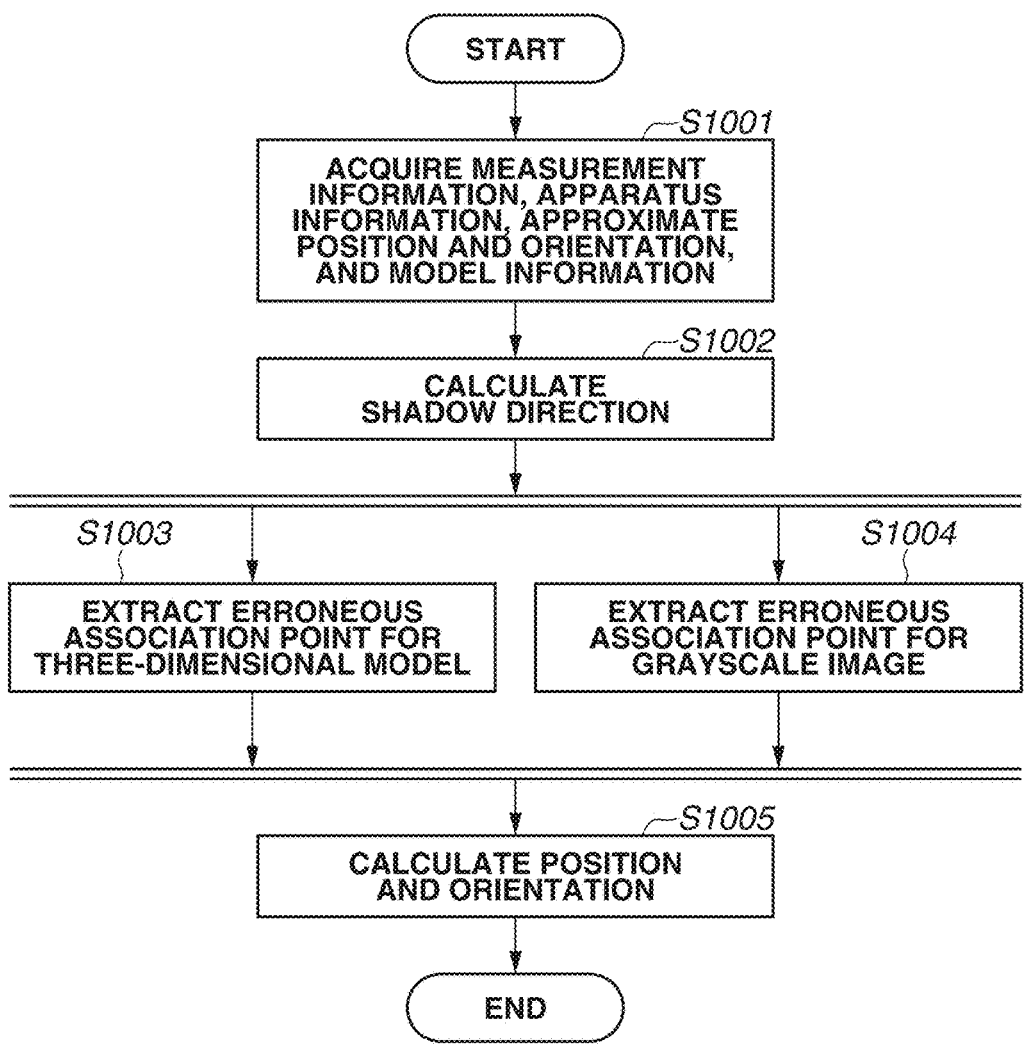

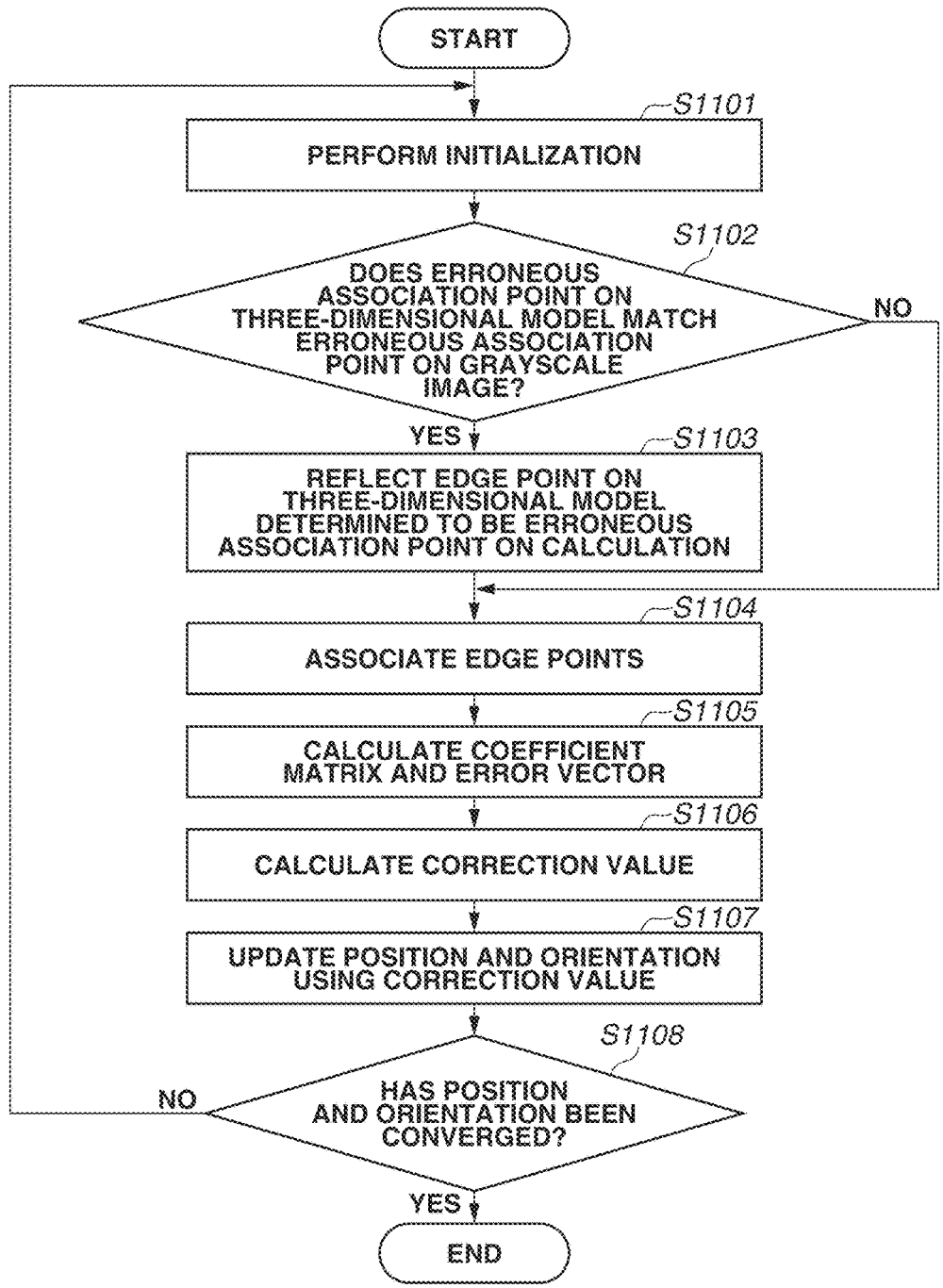

INFORMATION PROCESSING APPARATUS, INFORMATION PROCESSING METHOD, AND STORAGE MEDIUM

BACKGROUND OF THE INVENTION

1. Field of the Invention

The present invention relates to a technique for measuring a position and orientation of an object whose three-dimensional shape has already been known.

2. Description of the Related Art

In production sites, robotic automation has been introduced to improve production efficiency. In robotic assembly work, a target object needs to be recognized to acquire an accurate position and orientation. As a method for implementing such operations, a method using a grayscale image and a distance image obtained by capturing the target object has been developed. Noises generated due to various factors are mixed in the grayscale image and the distance image. Therefore, a method having high robustness to the noises is desired.

For example, a method for measuring a position and orientation of a camera using a model fitting method for fitting measurement data obtained from a grayscale image and a distance image obtained by capturing a target object into a shape model has been known. A specific example is a method for giving an approximate position and orientation of a target object and optimizing the position and orientation so that an edge extracted from the grayscale image and a distance value obtained from the distance image are more correctly fitted into a shape model. As means for making the measurement of the position and orientation of the camera robust, a method of generating a plurality of approximate positions and orientations at predetermined sampling intervals in a range that the position and orientation of the camera can take, performing repeated calculation for the fitting at each of the approximate positions and orientations, and setting a best fitting result as a final fitting result has been known.

A method for making a shadow existing in the grayscale image and the distance image obtained by capturing the target object robust, a method of performing processing not to erroneously associate, after estimating information about a shadow area of a target object in an acquired image, with a false contour in the shadow area has been proposed. In Japanese Patent Application Laid-Open No. 2012-42396, after an area where a distance value in a distance image includes a deficit is determined as a shadow area, different weighting factors are used depending on whether points to be associated with each other exist in the shadow area during optimization calculation for fitting.

A method discussed in Japanese Patent Application Laid-Open No. 2012-42396 premises a case where a portion where a shadow is generated is definitely reflected as a deficit portion in the distance image, and cannot cope with a shadow having a distance value in the distance image due to an effect such as secondary reflected light.

SUMMARY OF THE INVENTION

According to a first aspect of the present invention, an information processing apparatus includes an acquisition unit configured to acquire an image, including a measurement target object, captured by an image capturing apparatus, a storage unit configured to store information about a plurality of geometric features constituting a three-dimensional model of the measurement target object, a setting unit configured to set, when the plurality of geometric features is associated with a plurality of image features in the image, a flag for the geometric feature that may correspond to the image feature caused by a shadow of the measurement target object, an association unit configured to associate the plurality of geometric features with the plurality of image features detected from the image based on an approximate position and orientation of the measurement target object and the flag set by the setting unit, and a derivation unit configured to derive a position and orientation of the measurement target object based on a result of the association by the association unit.

According to another aspect of the present invention, an information processing apparatus includes an acquisition unit configured to acquire an image, including a measurement target object, captured by an image capturing apparatus, a storage unit configured to store information about a plurality of geometric features constituting a three-dimensional model of the measurement target object, a setting unit configured to set, among a plurality of image features detected from the image, a flag for the image feature caused by a shadow of the measurement target object, an association unit configured to associate the plurality of geometric features with the plurality of image features detected from the image based on an approximate position and orientation of the measurement target object and the flag, and a derivation unit configured to derive a position and orientation of the measurement target object based on a result of the association by the association unit.

According to still another aspect of the present invention, an information processing apparatus includes an acquisition unit configured to acquire an image, including a measurement target object, captured by an image capturing apparatus, a storage unit configured to store information about a plurality of geometric features constituting a three-dimensional model of the measurement target object, a first setting unit configured to set, when the plurality of geometric features is associated with a plurality of image feature in the image, a first flag for the geometric feature that may correspond to the image feature caused by a shadow of the measurement target object, a second setting unit configured to set, among the plurality of image features detected from the image, a second flag for the image feature caused by the shadow of the measurement target object, an association unit configured to associate the plurality of geometric features with the plurality of image features detected from the image based on an approximate position and orientation of the measurement target object and the first flag and the second flag, and a derivation unit configured to derive a position and orientation of the measurement target object based on a result of the association by the association unit.

According to a technique described in the present specification, even if an image including an object includes a shadow, a position and orientation of the object can be measured with high accuracy.

Further features of the present invention will become apparent from the following description of exemplary embodiments with reference to the attached drawings.

BRIEF DESCRIPTION OF THE DRAWINGS

FIG. 3 is a flowchart illustrating a procedure for position and orientation calculation processing according to the first and second exemplary embodiments.

FIG. 4 is a flowchart illustrating a specific procedure for erroneous association point detection processing according to the first exemplary embodiment.

FIG. 5 is a flowchart illustrating a specific procedure for the position and orientation calculation processing according to the first and second exemplary embodiments.

FIG. 10 is a flowchart illustrating a procedure for position and orientation calculation processing according to the third exemplary embodiment.

FIG. 11 is a flowchart illustrating a specific procedure for the position and orientation calculation processing according to the third exemplary embodiment.

DESCRIPTION OF THE EMBODIMENTS

Exemplary embodiments of the present invention will be specifically described below with reference to the accompanying drawings.

An information processing apparatus according to exemplary embodiments of the present invention will be specifically described below.

A hardware configuration on which an information processing apparatus according to each of the exemplary embodiments of the present invention is mounted will be described with reference to FIG. 15 prior to describing an exemplary embodiment.

Figure 15:
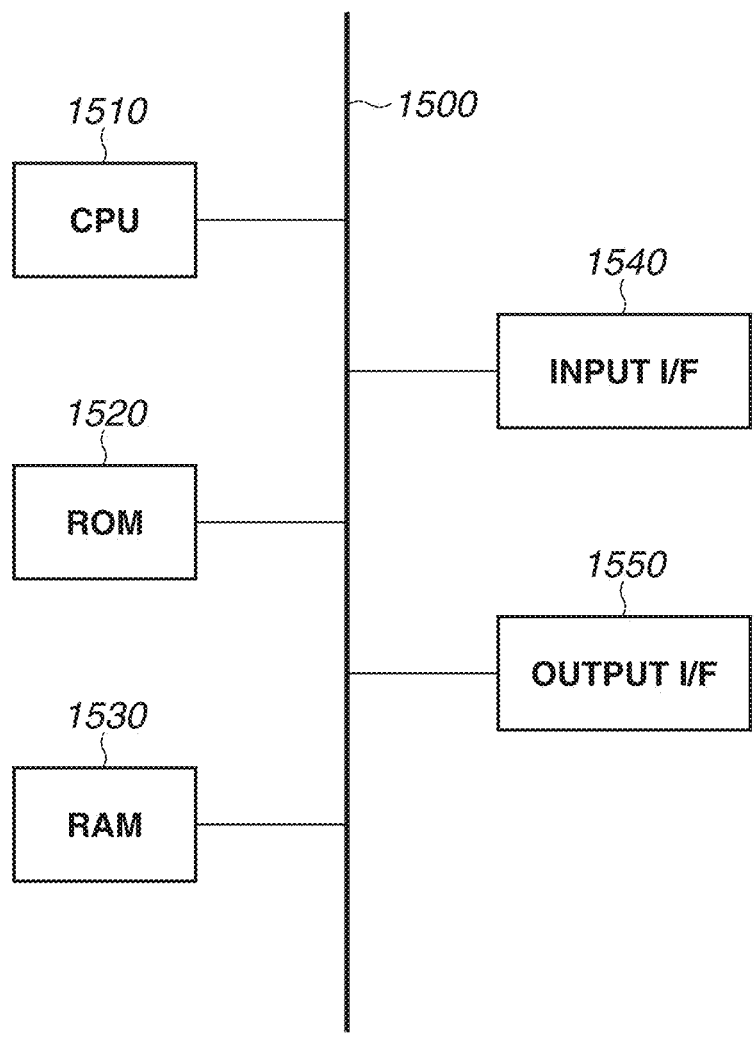
FIG. 15 is a block diagram illustrating an example of a hardware configuration of an information processing apparatus according to the exemplary embodiments of the present invention.

FIG. 15 illustrates a hardware configuration of an information processing apparatus 104 according to the present exemplary embodiment. In FIG. 15, a central processing unit (CPU) 1510 integrally controls devices connected to one another via a bus 1500. The CPU 1510 reads out and executes a processing step or program stored in a read-only memory (ROM) 1520. Each of processing programs according to the present exemplary embodiment, including an operating system (OS), and a device driver is stored in the ROM 1520, is temporarily stored in a random access memory (RAM) 1530, and is executed, as needed, by the CPU 1510. An input interface (I/F) 1540 inputs an input signal in a form processable by an information processing apparatus 104, from the external apparatus (an image capturing apparatus, a display apparatus, an operation apparatus, etc.). An output I/F 1550 outputs an output signal in a form processable by an external apparatus, to the external apparatus (a display apparatus, etc.).

Figure 1:
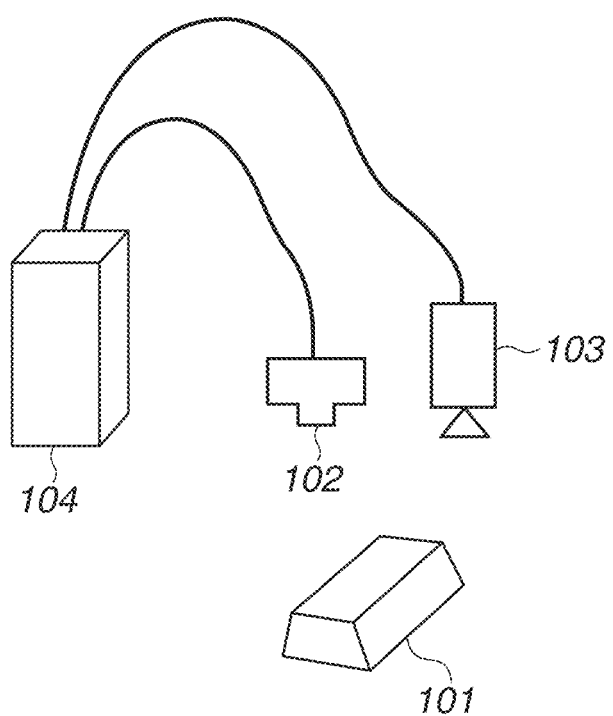
FIG. 1 illustrates a configuration of a system according to first to third exemplary embodiments.

Points, which are liable to erroneously correspond to each other, are extracted for a three-dimensional model according to a first exemplary embodiment. FIG. 1 is a schematic diagram of a system configuration using the information processing apparatus 104 according to a first exemplary embodiment.

A measurement target object 101 is an object whose position and orientation is to be measured. In the present exemplary embodiment, only one of measurement target objects 101 serving as a position and orientation measurement target is placed at a position, as illustrated in FIG. 1, for simplicity of description. However, position and orientation measurement processing, described below, does not greatly depend on the shape, the number, and the placement form of the measurement target objects 101. The present exemplary embodiment is also applicable to a case where, with a plurality of measurement target objects respectively having different shapes mixed and stacked, for example, a position and orientation of the given measurement target object is measured.

Figure 2:
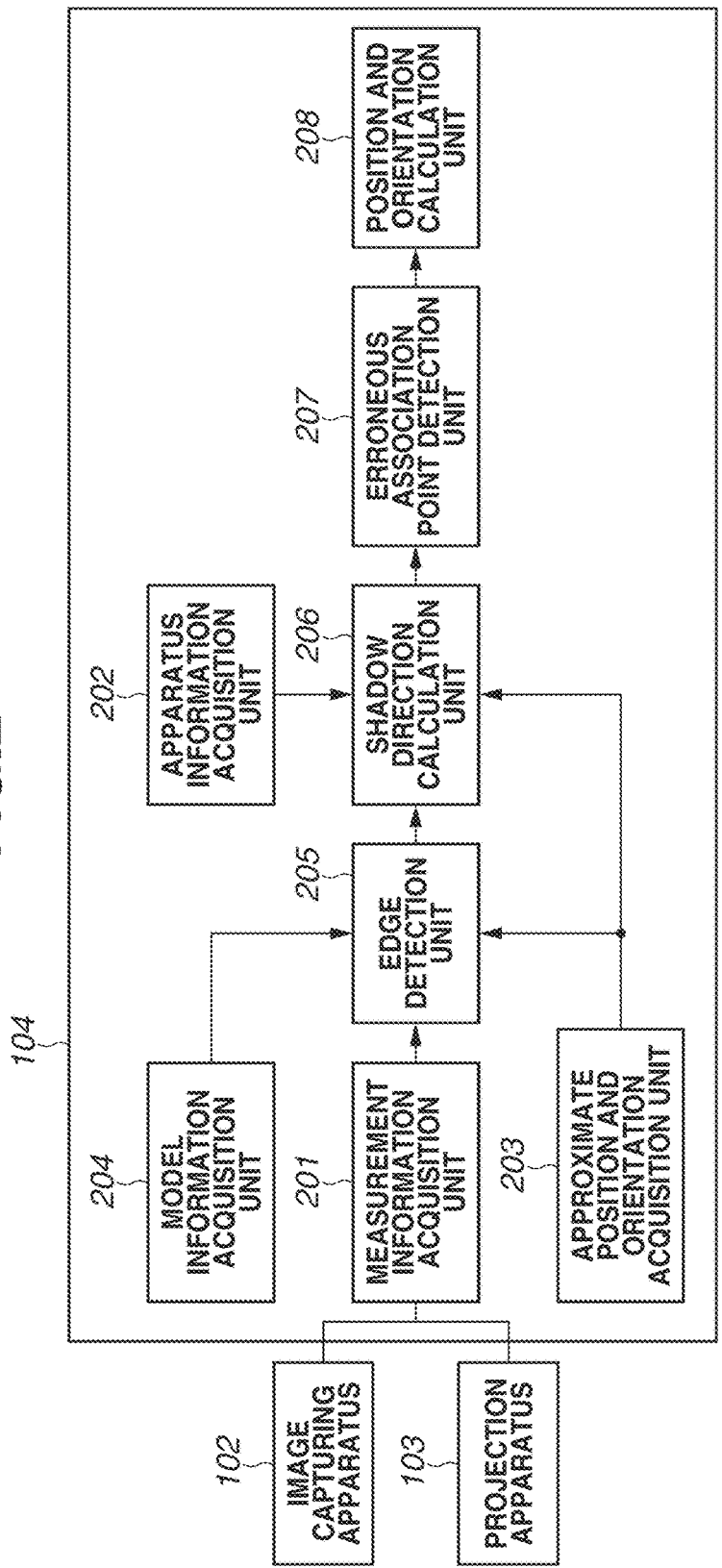
FIG. 2 is a block diagram illustrating a module configuration of respective programs according to the first to third exemplary embodiments.

FIG. 2 illustrates a system configuration using the information processing apparatus 104 according to the first exemplary embodiment.

The information processing apparatus 104 is connected to an image capturing apparatus 102 and a projection apparatus 103, and controls respective operations of the projection apparatus 103 and the image capturing apparatus 102 while obtaining a position and orientation of the measurement target object 101 using a captured image obtained from the image capturing apparatus 102.

The image capturing apparatus 102 captures a still image or a moving image in a real space, and is used to capture the measurement target object 101 that has been irradiated with light by the projection apparatus 103 according to the present exemplary embodiment. The image capturing apparatus 102 transmits the captured image to the information processing apparatus 104. Intrinsic parameters (a focal length, a principal point position, and a lens distortion parameter) of the image capturing apparatus 102 are previously corrected using a Zhang's method, described below, for example.

The projection apparatus 103 is used to irradiate the measurement target object 101 with predetermined light. The projection apparatus 103 is a liquid crystal projector. The intrinsic parameters (focal length, principal point position, and lens distortion parameter) of the projection apparatus 102 are previously corrected using a method discussed in a non-patent document (Z. Zhang, "A flexible new technique for camera calibration," IEEE Transactions on Pattern Analysis and Machine Intelligence, vol. 22, no. 11, pp. 1330-1334, 2000), for example. An apparatus other than the projection apparatus 103 may be used if it can project slit light. For example, a projector using a digital mirror device (DMD) or a liquid crystal on silicon (LCOS) may be used.

A functional configuration example of the information processing apparatus 104 will be described below. A measurement information acquisition unit 201 takes a grayscale image and a distance image, which have been acquired by the image capturing apparatus 102, into the information processing apparatus 104 as measurement information (image acquisition).

An apparatus information acquisition unit 202 acquires positional relationship information between the projection apparatus 103 and the image capturing apparatus 102 as prior information. The positional relationship information between the projection apparatus 103 and the image capturing apparatus 102 is obtained by the projection apparatus 102 emitting pattern light and a camera capturing the projected pattern, and then, by using a method discussed in a document (M. Kimura, "Projector Calibration using Arbitrary Planes and Calibrated Camera" Computer Vision and Pattern Recognition, CVPR, 2007), described below, for example.

An approximate position and orientation acquisition unit 203 acquires an approximate value of a position and orientation of the measurement target object 101 with respect to the image capturing apparatus 102 (approximate position and orientation acquisition). The input approximate position and orientation is given as an initial value for iterative calculation for obtaining the position and orientation of the measurement target object 101. In the present exemplary embodiment, the information processing apparatus 104 uses a measurement value previously obtained (obtained at the previous time) as an approximate position and orientation assuming that the measurement is performed continuously in a time axis direction.

However, a method for inputting the approximate value of the position and orientation is not limited to this. For example, the speed and the angular velocity of an object may be estimated using a time series filter based on measurement of the past position and orientation, to predict the current position and orientation from the past position and orientation and the estimated speed and angular velocity. An approximate position and orientation of the measurement target object 101 may be estimated by respectively storing images of a target object captured in various orientations as templates and performing template matching (pattern matching) with respect to an input image. Alternatively, if another sensor can measure the position and orientation of the measurement target object 101, an output value from the sensor may be used as an approximate value of the position and orientation.

The sensor may be a magnetic sensor that measures a position and orientation by detecting a magnetic field emitted by a transmitter, for example, using a receiver mounted on an object. Alternatively, the sensor may be an optical sensor that measures a position and orientation by capturing a marker arranged on an object with a camera fixed to a scene. In addition, the sensor may be any sensor if it measures a position and orientation with a six-degree-of-freedom. If an approximate position and orientation where the object is placed is previously found, its value may be used as an approximate value.

A model information acquisition unit 204 stores three-dimensional model information about the measurement target object 101. The three-dimensional model information is a computer-aided design (CAD) model itself that can be handled by three-dimensional CAD software or a plurality of polygon elements used in a Computer Graphics field into which a three-dimensional CAD model has been converted. In the present exemplary embodiment, a three-dimensional geometric model imitating a shape of the measurement target object 101 and composed of polygon elements is used. However, a shape model is not limited to this. The shape model may be any model representing a shape including an edge.

An edge detection unit 205 detects edge information to be used in a shadow direction calculation unit 206, an erroneous association point detection unit 207, and a position and orientation calculation unit 208, described below, from the acquired measurement information, apparatus information, approximate position and orientation information, and model information. Edge information to be detected includes one about a three-dimensional model and one about a grayscale image. The edge information to be detected includes three-dimensional coordinates of a point on an edge in the three-dimensional model, two-dimensional coordinates of an edge point on an image plane virtually set, and two-dimensional coordinates of an edge point on the grayscale image. However, edge information to be detected may be not only a point but also a vector representing a direction of an edge to which each edge point belongs (a direction of a straight line or a direction tangent to a curve line), for example.

The shadow direction calculation unit 206 calculates a shadow direction for each edge in the three-dimensional model, which has been calculated by the edge detection unit 205, or each point set on the edge, and gives the calculated shadow direction thereto. The shadow direction means a direction of a shadow, which is presumed to be generated in the neighborhood of a given edge of the measurement target object 101, calculated by a relative positional relationship between the projection apparatus 103 and the image capturing apparatus 102 and a three-dimensional model whose position and orientation has been virtually set. In the present exemplary embodiment, a shadow direction vector to be calculated is a vector on a two-dimensional plane. Examples of the shadow direction vector include one obtained by projecting a direction vector directed from the projection apparatus 103 toward a three-dimensional model in an approximate position and orientation virtually set onto an image plane of the image capturing apparatus 102, like in step S302, described below.

However, the shadow direction vector to be calculated is not limited to this. For example, the shadow direction vector may be a three-direction vector. As an example of the three-dimensional vector, it is useful to employ a direction vector itself directed from the projection apparatus 103 toward each of edges in a three-dimensional model in an approximate position and orientation virtually set from the projection apparatus 103. A shadow direction vector to be given is calculated for each edge point on a three-dimensional model to obtain information about the strictest shadow generation direction in the present exemplary embodiment. When a plurality of edge points exists on a straight line or a curve line forming one edge, however, the edge points may be grouped as an entity for each edge and given a typical shadow direction vector for simplicity of calculation processing. Alternatively, the edge points in the three-dimensional model may be given one typical shadow direction vector.

The erroneous association point detection unit 207 extracts an erroneous association point based on information about a shadow direction. An erroneous association point means a portion that may be erroneously associated with an edge derived from a shadow during position and orientation calculation. While a portion to be extracted at a point set on the edge in the three-dimensional model in the present exemplary embodiment, the edge for which the edge points are grouped, described above, may be extracted.

The position and orientation calculation unit 208 derives (calculates) the position and orientation of the measurement target object 101 using information about the detected erroneous association point in addition to the acquired measurement information, apparatus information, and approximate position and orientation information. More specifically, after the information about the erroneous association point is reflected on information about the edge in the three-dimensional model, an association unit (not illustrated) derives the position and orientation of the measurement target object 101 by repeating association of the edge in the three-dimensional model and the edge in the grayscale image and optimization calculation using a least-square method for the position and orientation in which the sum of distances among corresponding points reaches a minimum.

An example of a configuration of the information processing apparatus 104 has been described above.

Each of functional units constituting the information processing apparatus 104 is implemented when the CPU 1510 loads the program stored in the ROM 1520 into the RAM 1530 and performs processing according to each of flowcharts, described below. If hardware is used as an alternative to software processing using the CPU 1510, for example, a calculation unit or a circuit corresponding to processing of each of the functional units may be configured.

A procedure for position and orientation calculation processing according to the present exemplary embodiment will be described below. FIG. 3 is a flowchart illustrating the procedure for the position and orientation calculation processing according to the present exemplary embodiment.

In step S301, information required for later position and orientation calculation is acquired. More specifically, measurement information, apparatus information, an approximate position and orientation, and model information are acquired. The measurement information acquisition unit 201, the apparatus information acquisition unit 202, the approximate position and orientation acquisition unit 203, and the model information acquisition unit 204 respectively acquire the information. The acquired information is sent to the edge detection unit 205. A grayscale image serving as the measurement information is an image obtained by capturing the measurement target object 101, which has been irradiated with illumination using the projection apparatus 103, by the image capturing apparatus 102. However, the grayscale image may be one previously stored on an external memory or a network and read by the measurement information input unit 201. The information, which is acquired in step S301, may be acquired at the same time or in order depending on the processing speed performance of the information processing apparatus 104, or may be acquired in any order.

In step S302, the edge detection unit 205 calculates information about respective edges for a three-dimensional model and a grayscale image.

In the present exemplary embodiment, the edges are specifically obtained in the following manner.

For the three-dimensional model, a point is generated on the edge in the three-dimensional model, to obtain three-dimensional information about each edge point (geometric feature). An edge in a three-dimensional model means a portion that forms a contour of a three-dimensional model in an approximate position and orientation when the three-dimensional model is viewed on a virtually set image plane of the image capturing apparatus 102. While a method for generating a point on an edge includes a method of generating a plurality of points to be equally spaced on an edge in a three-dimensional model arranged in a virtual three-dimensional space, the method need not necessarily be used.

For example, three-dimensional coordinates on an edge in a three-dimensional model in an approximate position and orientation may be generated by back calculation so that edge points are equally spaced on a virtually set image plane of the image capturing apparatus 102 when the three-dimensional model is viewed on the image plane. When a vector between edge points generated on the same edge is calculated, a three-dimensional vector representing a direction of the edge can also be calculated.

When the edge points on the three-dimensional model in an approximate position and orientation are then projected onto a virtually set image plane of the image sensing apparatus 102, two-dimensional coordinates of the edge point as viewed on the image plane are obtained. The calculated two-dimensional coordinates of the edge point are stored while being linked to information about the corresponding edge point on the three-dimensional model.

For the grayscale image, a luminance value in the grayscale image is referred to, and two-dimensional coordinates of a pixel at which a luminance value takes an extreme value are determined to be an edge point (image feature) for peripheral pixels in any search direction, to store information. A threshold value may be provided for a determination criterion of an edge point. A pixel in a grayscale image at which a luminance value or a luminance gradient value is a threshold value or larger and takes an extreme value may be determined to be an edge point. Processing for performing search with the edge point on the three-dimensional model projected onto the image plane as a starting point and detecting an edge point on the grayscale image positioned in its neighborhood may be previously performed, as described below in step S503.

In step S303, the shadow direction calculation unit 206 then calculates a direction in which a shadow is presumed to be generated for the edge in the model information and gives the direction to the model information. In the present exemplary embodiment, a shadow direction vector to be calculated is obtained by projecting a direction vector directed from the projection apparatus 103 toward the three-dimensional model in the approximate position and orientation virtually set onto the image plane of the image capturing apparatus 102.

In the present exemplary embodiment, the shadow direction is specifically obtained in the following manner.

First, a projection matrix P for projecting a three-dimensional position (Xo, Yo, Zo) of an edge point in an approximate position and orientation of a three-dimensional model virtually set and a three-dimensional position (Xp, Yp, Zp) of the projection apparatus 103 onto the image plane of the image capturing apparatus 102 is obtained. A three-dimensional position of a three-dimensional model to be used is a positional component of an approximate position and orientation of a measurement target object with respect to a camera. The three-dimensional position of the projection apparatus 103 is obtained based on an approximate position and orientation of the three-dimensional model with respect to the image capturing apparatus 102 and information about a positional relationship between the projection apparatus 103 and the image capturing apparatus 102 as previous information. The projection matrix P is represented by a product K×RT of a camera parameter K (Equation 1) and a conversion matrix RT (Equation 2) from a world coordinate system to a camera coordinate system:

$$K = \begin{bmatrix} a & b & c \\ 0 & d & e \\ 0 & 0 & 1 \end{bmatrix} \quad \text{(Equation 1)}$$

$$RT = \begin{bmatrix} 1 & 0 & 0 & 0 \\ 0 & 1 & 0 & 0 \\ 0 & 0 & 1 & 0 \end{bmatrix} \quad \text{(Equation 2)}$$

The camera coordinate system is set as the world coordinate system. Thus, the projection matrix P is expressed by (Equation 3). Elements a, b, c, d, and e in the camera parameter K are parameters specific to the camera, and are previously obtained, as described above:

$$P = \begin{bmatrix} a & b & c & 0 \\ 0 & d & e & 0 \\ 0 & 0 & 1 & 0 \end{bmatrix} \quad \text{(Equation 3)}$$

A position (uo, vo) on the image plane of the three-dimensional model and a position (up, vp) on the image plane of the projection apparatus 103 are obtained from relational equations (Equation 4) and (Equation 5) of the projection matrix P, homogeneous coordinates (Xo, Yo, Zo, 1) of a three-dimensional position of the three-dimensional model, homogeneous coordinates (Xp, Yp, Zp, 1) of a three-dimensional position of the image capturing apparatus 102, and respective homogeneous coordinates (uo, vo, 1) and (up, vp, 1) of points obtained by projecting the three-dimensional positions onto the image plane. A vector r'= (up-uo, vp-vo) from the position (uo, vo) on the image plane of the three-dimensional model to the position (up, vp) on the image plane of the projection apparatus 103 is obtained, and is further converted into a unit vector r=r'/|r'| as a shadow direction:

$$\begin{bmatrix} u_o \\ v_o \\ 1 \end{bmatrix} = P \Big/ Z_o \begin{bmatrix} X_o \\ Y_o \\ Z_o \\ 1 \end{bmatrix} \quad \text{(Equation 4)}$$

$$\begin{bmatrix} u_p \\ v_p \\ 1 \end{bmatrix} = P \Big/ Z_p \begin{bmatrix} X_p \\ Y_p \\ Z_p \\ 1 \end{bmatrix} \quad \text{(Equation 5)}$$

The edge point on the three-dimensional model on the image plane is then associated with the shadow direction. An erroneous association point in the subsequent step S304 can be extracted by the association.

In step S304, the erroneous association point detection unit 207 extracts an edge point that may be erroneously associated with an edge derived from a shadow (an edge caused by a shadow) as the erroneous association point based on the information about the shadow direction that has been calculated for each of the edge points on the three-dimensional model in step S303.

FIG. 4 is a flowchart illustrating a processing procedure in the present exemplary embodiment. Steps in step S304 will be described below.

First, the erroneous association point detection unit 207 projects any point on a plane of a three-dimensional model virtually set based on an approximate position and orientation onto the image plane of the image capturing apparatus 102. A preferred example of a method for setting points on the plane of the three-dimensional model may include a method for setting points to be equally spaced on the plane. Points on the plane of the three-dimensional model may be obtained by back calculation to be equally spaced on the image plane onto which the points have been projected.

In steps S402, the erroneous association point detection unit 207 then calculates a distance from the point set on the image plane to a corresponding point on the three-dimensional model. The point to be a distance calculation target includes both a point corresponding to the plane of the three-dimensional model that has been set in step S401 and a point corresponding to the edge in the three-dimensional model that has been set in step S302. More specifically, in step S402, processing equivalent to acquisition of a distance image relating to the three-dimensional model on a space virtually set is performed so that the image capturing apparatus 102 acquires a distance image for the measurement target object 101. A calculated distance value is stored while being linked to a corresponding point on the image plane.

In step S403, the erroneous association point detection unit 207 searches for a neighborhood point on the image plane in the shadow direction on the image plane for the focused edge point and acquires a corresponding distance value. The distance value to be acquired is the one that has been obtained in step S402.

Figure 13A:
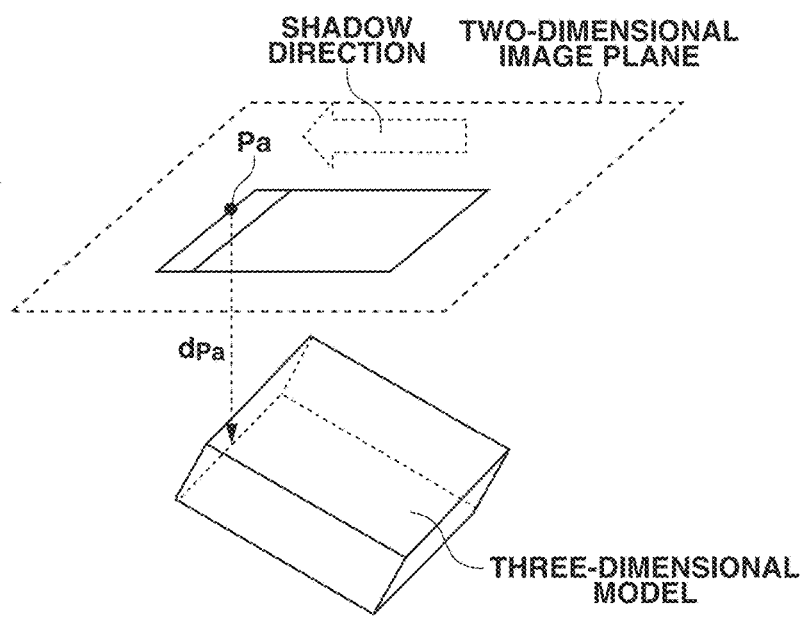
FIGS. 13A and 13B illustrate a relationship on a virtual space between an approximate position and orientation of a three-dimensional model and an image plane of an image capturing apparatus according to the first exemplary embodiment.
Figure 13B:
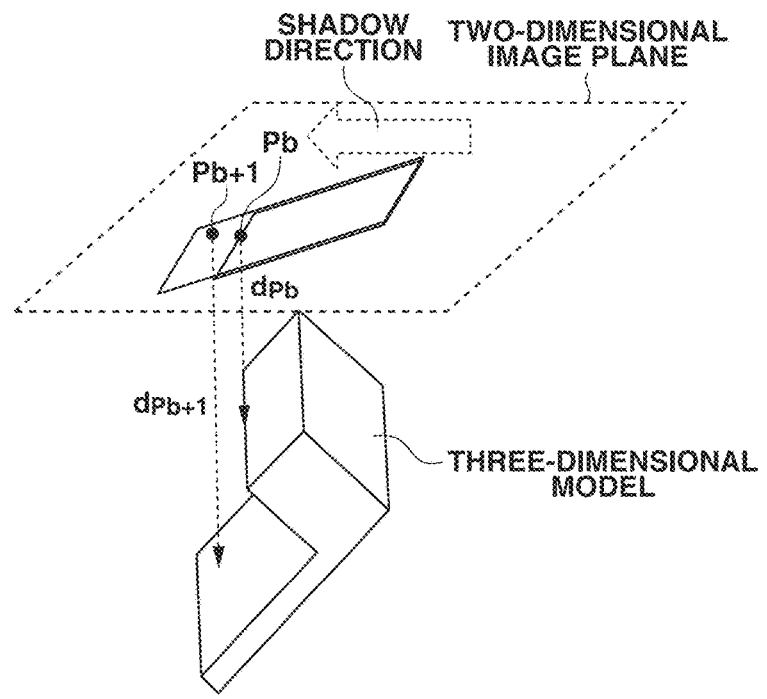

FIGS. 13A and 13B are respectively conceptual diagrams illustrating, for a given point on an edge, relationships between the point and a distance value when a neighborhood point on an image plane is searched for in a shadow direction. FIGS. 13A and 13B respectively illustrate different three-dimensional models. In FIGS. 13A and 13B, points Pa and Pb are respectively illustrated as focused edge points. Distance values respectively corresponding to the points Pa and Pb are indicated as $d_{Pa}$ and $d_{Pb}$. Further, in FIG. 13B, a distance value corresponding to a neighborhood point Pb+1 obtained when the search is performed in the shadow direction is indicated as $dp_{Pb+1}$.

In step S404, the erroneous association point detection unit 207 determines whether either one of the following two conditions is satisfied for the focused edge point. Under this condition, it is determined whether a large step exists in the shadow direction with the focused edge point as a boundary. In other words, when it is determined whether a shadow can be generated in the neighborhood of the focused edge point on a space virtually set, the presence or absence of the possibility of erroneous association is determined in position and orientation calculation processing, described below.

Condition A: A neighborhood point in a shadow direction does not exist

Condition B: A difference between a distance value corresponding to a focused edge point and a distance value corresponding to a neighborhood point is a threshold value or larger If the condition A is satisfied (if, as a result of searching a predetermined range in the shadow direction, starting at a projected point Pa (a focused geometric feature), an edge point other than the point Pa (other than the focused geometric feature) is not detected), the point Pa and a background look in contact with each other on the image plane, and a shadow may be generated in the shadow direction as viewed from the point Pa. FIG. 13A illustrates an example in which the condition A is satisfied. On the other hand, if the condition B is satisfied, a three-dimensional model is in a shape having a large step, and a point Pb can be an edge of the step. Also in this case, a shadow may be generated in the shadow direction as viewed from the point Pb. FIG. 13B illustrates an example in which the condition B is satisfied. In this case, a value to be compared with a threshold value is a difference between $d_{Pb+1}$ and $d_{Pb}$. If the condition A or the condition B is satisfied (YES in step S404), the processing proceeds to step S405. Otherwise (NO in step S404), the processing proceeds to step S406.

If the condition A or the condition B is satisfied (YES in step S404), the shadow may be generated in the neighborhood of the focused edge point (the focused geometric feature). When the position and orientation of the measurement target object 101 is calculated, therefore, erroneous association may be performed. Accordingly, in step S405, the erroneous association point detection unit 207 newly gives flag information to the edge point that may be determined to be an erroneous association point.

In step S406, the erroneous association point detection unit 207 checks whether all the edge points have been determined to be erroneous association points. If all the edge points have been determined to be the erroneous association points (YES in step S406), the process in step S304 ends, and the processing proceeds to step S305. On the other hand, if the edge point, which has not yet been determined to be the erroneous association point, exists (NO in step S406), the processing proceeds to step S403, and the processes from step S404 to step 406 are repeated.

When the processes from step S401 to step S406 are executed, the erroneous association point is extracted.

In step S305, the erroneous association point detection unit 207 calculates the position and orientation of the measurement target object 101 by processing, described below, using the information about the edge point that has been extracted in step S304.

FIG. 5 is a flowchart illustrating a specific procedure for position and orientation calculation processing for calculating a position and orientation by optimization calculation using an approximate position and orientation, illustrated in step S305.

In the present exemplary embodiment, an approximate position and orientation of a position and orientation (hereinafter indicated by s) of a measurement target object is repeatedly corrected by an iterative operation using a Gauss-Newton method, to calculate the position and orientation s. The position and orientation is optimized so as to minimize the sum of the distances between an edge detected on a grayscale image and an edge in a three-dimensional model projected onto the image based on a position and orientation s to be estimated. More specifically, the position and orientation s of the measurement target object is represented as a primary function of a minimal change in the position and orientation s of the object by a signed distance between a point and a straight line on the grayscale image and primary Taylor expansion. The position and orientation s is repeatedly corrected by solving a linear simultaneous equation relating to the minimal change in the position and orientation s so that the signed distance becomes zero to find the minimal change in the position and orientation s of the object.

In step S501, the position and orientation calculation unit 208 performs initialization. The approximate position and orientation, which has been acquired in step S301, is set as the position and orientation s of the three-dimensional model. Information about the edge point on the three-dimensional model, information about the edge point on the grayscale image, and information about the erroneous association point are also acquired.

In step S502, the position and orientation calculation unit 208 performs processing for reflecting the edge point determined to be the erroneous association point, which has been extracted in step S304, from among the edge points on the three-dimensional model, onto the subsequent calculation. The edge point can be easily extracted because flag information is given thereto. As a reflection method, the edge point determined to be the erroneous association point is inactivated and is not used for the subsequent calculation in the present exemplary embodiment. Therefore, association is not performed in step S503 for the edge point that is given the flag information. However, the edge point determined to be the erroneous association point is not necessarily inactivated. As a reflection method other than the inactivation, the edge point determined to be the erroneous association point may be reflected on a value of a weight coefficient for position and orientation measurement in step S503, described below, for example. More specifically, when the value of the weight coefficient corresponding to the edge point determined to be the erroneous association point is set lower than a weight coefficient corresponding to the edge point other than the edge point determined to be the erroneous association point, contribution to a position and orientation calculation result of the erroneous association point can be reduced.

Figure 6A:
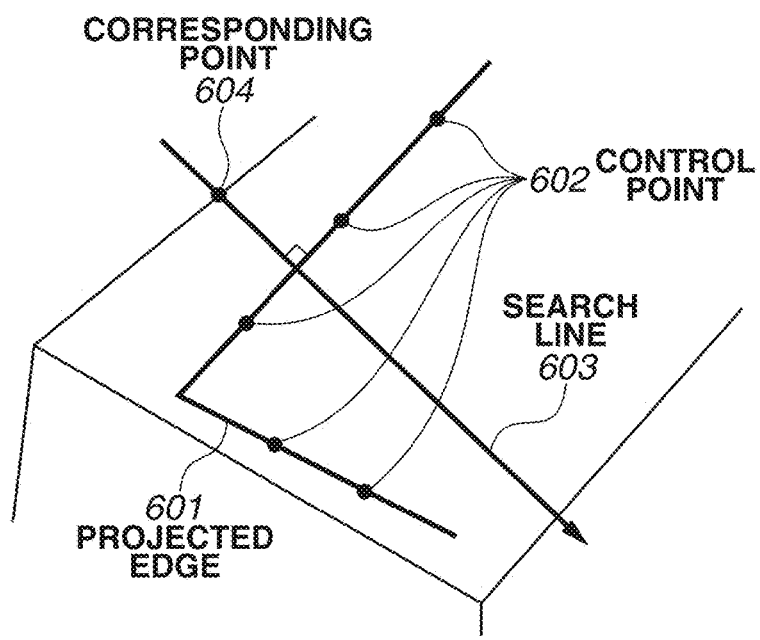
FIGS. 6A and 6B illustrate a principle of searching for a corresponding point according to the first to third exemplary embodiments.
Figure 6B:
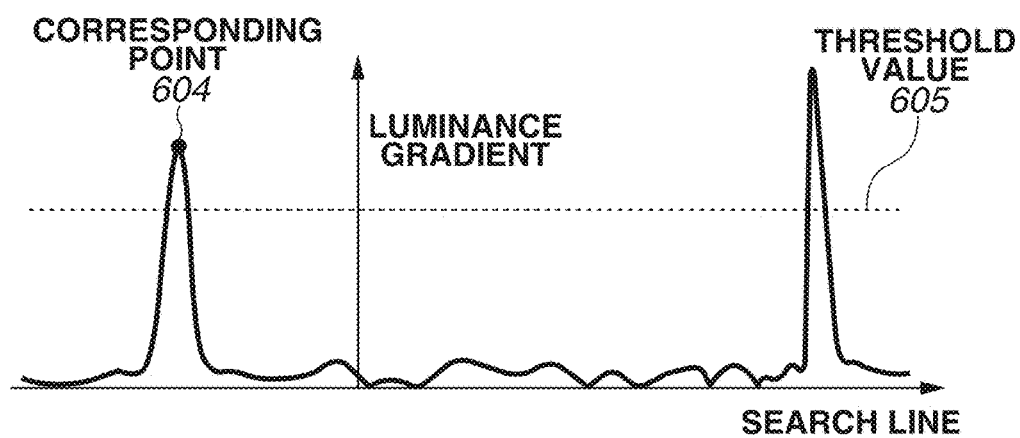

In step S503, the position and orientation calculation unit 208 associates the edges. FIGS. 6A and 6B illustrate a method for associating edges. FIG. 6A is a projection view of an edge in a three-dimensional model onto a grayscale image. First, a search line 603 is set in a direction normal to an edge 601 projected onto an image (into an image) for each of control points 602 on the edge 601. A one-dimensional edge is detected in a predetermined range of the search line 603 with the control point 602 as the origin, and a point closest to the control point 602 in the detected edge is stored as a corresponding point 604. FIG. 6B is a graph with the control point 602 as the origin and with the search line 603 and an absolute value of a luminance gradient, respectively, on the abscissa and the ordinate. On the previous image, an edge is detected as an extreme value of the absolute value of the luminance gradient at the pixel. The point 604, whose extreme value of the absolute value of the luminance gradient is larger than a predetermined threshold value 605, and closest to the control point 602, is determined to be the corresponding point.

The edge point on the three-dimensional model, which has been determined to be an erroneous association point in step S502, has a flag, as described above. Therefore, association may not be performed for the edge point with the flag. Even when association has been performed for the edge point, a weight may be reduced in calculation in step S505, described below.

In the present exemplary embodiment, association is performed for not only the grayscale image but also the acquired distance image. For the association for the distance image, any number of points are extracted from a plane of the three-dimensional model and are projected onto the distance image based on the approximate position and orientation. The projected point may be associated with a measurement point in the neighborhood of the projected point.

In step S504, the position and orientation calculation unit 208 calculates a coefficient matrix and an error vector for solving a linear simultaneous equations. Each of elements in the coefficient matrix is a primary partial derivative with respect to a minimal change in an estimated value of a position and orientation, and is specifically a partial derivative of image coordinates. The error vector is a distance on an image between a projected edge and a detected edge.

Figure 7:
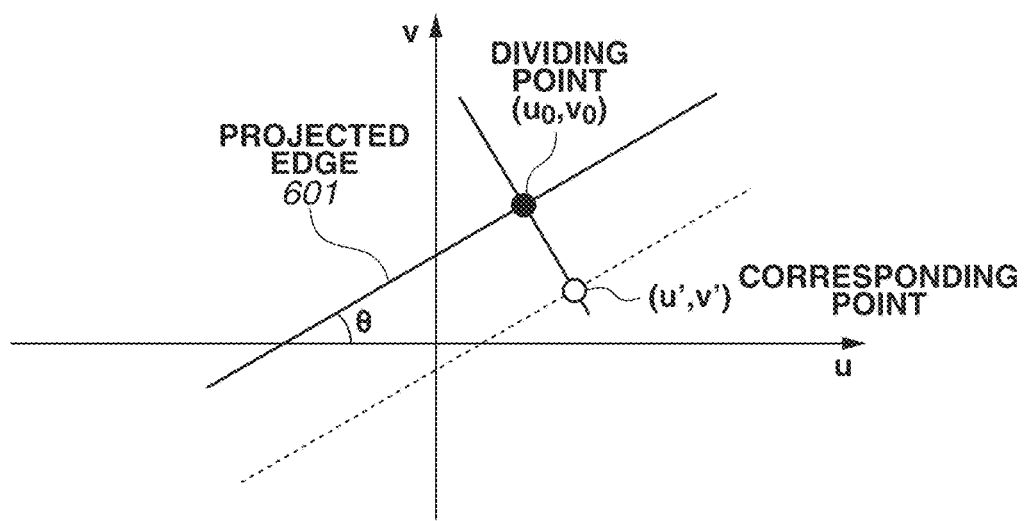
FIG. 7 illustrates a relationship between a projected image of an edge and a detected edge according to the first to third exemplary embodiments.

FIG. 7 illustrates a relationship between a projected image of an edge and a detected edge. In FIG. 7, a horizontal direction and a vertical direction of an image are respectively a u-axis and a v-axis. A position on an image of a control point (a point for equally dividing each projected edge on an image) is represented by ($u_0$, $v_0$), and an inclination on the image of the edge to which the control point belongs is represented by an inclination θ with respect to the u-axis. The inclination θ is calculated as an inclination of a straight line connecting the respective three-dimensional coordinates at both ends of the edge projected onto the image based on a position and orientation s. A normal vector on the image of the edge is (sinθ, −cos θ). Coordinates on the image of a point corresponding to the control point are (u', v'). A point (u, v) on a straight line passing through the point (u', v') and having an inclination θ (a constant) is expressed by the following equation:

$$u \sin θ - v \cos θ = d \qquad \text{(Equation 6)}$$

where d is a constant that is expressed by the following equation:

$$d = u' \sin θ - v' \cos θ \qquad \text{(Equation 7)}$$

A position on the image of the control point changes depending on the position and orientation s of the measurement target object 101. The degree of freedom of the position and orientation s of the measurement target object 101 is a six-degree-of-freedom. That is, the position and orientation s is a six-dimensional vector, and includes three elements representing a position of the measurement target object 101 and three elements representing an orientation of the measurement target object 101. The three elements representing the orientation are represented by an Eulerian angle, for example, or are represented by a three-dimensional vector whose direction represents a rotation axis and whose size represents a rotation angle. Coordinates on the image (u, v) of the control point that changes depending on the position and orientation s can be approximated, as expressed by (Equation 8), using primary Tayler expansion in the neighborhood of the coordinates ($u_0$, $v_0$), where $\Delta s_i$ (I=1, 2, . . . , 6) represents a minimal change of each of components of the position and orientation s.

$$u \approx u_0 + \sum_{i=1}^{6} \frac{\partial u}{\partial s_i} \Delta s_i \qquad \text{(Equation 8)}$$

$$v \approx v_0 + \sum_{i=1}^{6} \frac{\partial v}{\partial s_i} \Delta s_i$$

A position on the image of the control point obtained by the correct position and orientation s can be assumed to exist on the straight line that is expressed by (Equation 6). When u and v, which are approximated by (Equation 8), are substituted into (Equation 7), (Equation 9) is obtained:

$$\sin θ \sum_{i=1}^{6} \frac{\partial u}{\partial s_i} \Delta s_i - \cos θ \sum_{i=1}^{6} \frac{\partial v}{\partial s_i} \Delta s_i = d - r \qquad \text{(Equation 9)}$$

where r is a constant that is expressed by the following equation:

$$r = u_0 \sin θ - v_0 \cos θ$$

Three-dimensional coordinates in a coordinate system of the information processing apparatus 1 can be converted into three-dimensional coordinates (x, y, z) in a model coordinate system by the position and orientation s of the measurement target object 101. A point is converted into a point ($x_0$, $y_0$, $z_0$) in the model coordinate system using an estimated value of the position and orientation s. The three-dimensional coordinates (x, y, z) change depending on the position and orientation s of the measurement target object 101, and can be approximated, as expressed by (Equation 9), using primary Tayler expansion in the neighborhood of the point ($x_0$, $y_0$, $z_0$):

$$x \approx x_0 + \sum_{i=1}^{6} \frac{\partial x}{\partial s_i} \Delta s_i \qquad \text{(Equation 10)}$$

$$y \approx y_0 + \sum_{i=1}^{6} \frac{\partial y}{\partial s_i} \Delta s_i$$

$$z \approx z_0 + \sum_{i=1}^{6} \frac{\partial z}{\partial s_i} \Delta s_i$$

(Equation 9) holds for all edges for which the association has been performed in step S502. Thus, a linear simultaneous equation relating to $\Delta s_i$ holds, as expressed by (Equation 11).

$$\begin{bmatrix} \sin θ_1 \frac{\partial u_1}{\partial s_1} - \cos θ_1 \frac{\partial v_1}{\partial s_1} & \sin θ_1 \frac{\partial u_1}{\partial s_2} - \cos θ_1 \frac{\partial v_1}{\partial s_2} & \cdots & \sin θ_1 \frac{\partial u_1}{\partial s_6} - \cos θ_1 \frac{\partial v_1}{\partial s_6} \\ \sin θ_2 \frac{\partial u_2}{\partial s_1} - \cos θ_1 \frac{\partial v_2}{\partial s_1} & \sin θ_2 \frac{\partial u_2}{\partial s_2} - \cos θ_1 \frac{\partial v_2}{\partial s_2} & \cdots & \sin θ_2 \frac{\partial u_2}{\partial s_6} - \cos θ_1 \frac{\partial v_2}{\partial s_6} \\ & \vdots & \ddots & \vdots \end{bmatrix} \begin{bmatrix} \Delta s_1 \\ \Delta s_2 \\ \Delta s_3 \\ \Delta s_4 \\ \Delta s_5 \\ \Delta s_6 \end{bmatrix} = \begin{bmatrix} d_1 - r_1 \\ d_2 - r_2 \\ \vdots \end{bmatrix} \qquad \text{(Equation 11)}$$

(Equation 11) is represented as (Equation 12).

$$J\Delta s = E \quad \text{(Equation 12)}$$

A partial derivative for calculating a coefficient matrix J in the linear simultaneous equation (Equation 12) is calculated using a method discussed in a document (V. Lepetit and P. Fua, "Keypoint recognition using randomized trees", IEEE Transactions on Pattern Analysis and Machine Intelligence, vol. 28, no. 9, 2006), for example.

In step S505, the position and orientation calculation unit 208 obtains a correction value $\Delta s$ using a generalized inverse matrix $(J^T \cdot J)^{-1} \cdot J^T$ of a matrix J based on (Equation 12).

However, many edges are outliers by misdetection. Thus, a robust estimation method, as described below, is used. Generally, in the edge serving as the outlier, an error d−r increases. Therefore, a contribution degree to simultaneous equations (Equation 11) and (Equation 12) increases, and the accuracy of the correction value $\Delta s$ obtained as the result decreases. A small weight is given to data having a large error d−r, and a large weight is given to data having a small error d−r. The weight is given by a Tukey function, as expressed by (Equation 13), for example.

$$w(d-r) = \begin{cases} (1 - ((d-r)/c_1)^2)^2 & |d-r| \leq c_1 \\ 0 & |d-r| > c_1 \end{cases} \quad \text{(Equation 13)}$$

where $c_1$ and $c_2$ are respectively constants. A function for giving a weight need not be a Tukey function, but may be any function for giving a small weight to data having a large error and giving a large weight to data having a small error, such as a Huber function.

A weight corresponding to each data (edge) is $w_i$. A weight matrix W is defined, as expressed by (Equation 14):

$$W = \begin{bmatrix} w_1 & & & 0 \\ & w_2 & & \\ & & \ddots & \\ 0 & & & w_{N_c} \end{bmatrix} \quad \text{(Equation 14)}$$

The weight matrix W is a square matrix in which all components other than a diagonal component are zero, and the weight $w_i$ is inserted into the diagonal component. (Equation 11) is deformed into (Equation 14) using the weight matrix W.

$$WJ\Delta s = WE \quad \text{(Equation 15)}$$

(Equation 15) is solved, to obtain the correction value $\Delta s$, as expressed by (Equation 16):

$$\Delta s = (J^T W J)^{-1} J^T W E \quad \text{(Equation 16)}$$

When the above described calculation is also performed for association for the distance image, which has been obtained in step S504, a highly accurate correction value can be obtained using not only the grayscale image but also the distance image. More specifically, the effect of improving the accuracy of calculation of the position and orientation s for not only a plane direction but also a depth direction can be obtained by using the distance image at the same time.

In step S506, the position and orientation calculation unit 208 updates the position and orientation s to s+$\Delta s$ using the correction value $\Delta s$ that has been calculated in step S505.

In step S507, the position and orientation calculation unit 208 determines whether the position and orientation s has been converged. If it is determined that the position and orientation s has been converged (YES in step S507), the position and orientation s at that time is set as a fitting result, and the processing ends. If it is determined that the position and orientation s has not been converged (NO in step S507), the processes from step S502 to step S506 are repeatedly performed until the position and orientation s is converged. In the convergence determination, if it is determined that the correction value $\Delta s$ in step S506 is a predetermined value or smaller and hardly changes, it is determined that the position and orientation s has been converged. A method for the convergence determination is not limited to this. If the number of repetitions reaches a predetermined number of times, it may be determined that the position and orientation s has been converged.

As described above, the position and orientation s of the measurement target object 101 is calculated by the processes from step S501 to step S507.

While a three-dimensional position and orientation has been calculated above, a two-dimensional position and orientation may be calculated above. In this case, a vector s is a three-dimensional vector including two elements representing a position and an element representing an orientation.

A method for calculating the position and orientation of the measurement target object 101 in the present exemplary embodiment is not limited to a Gauss-Newton method. For example, the position and orientation may be calculated using a Levenberg-Marquardt method in which calculation is more robust, or may be calculated using a steepest descent method serving as a simpler method. Another nonlinear optimization calculation method such as a conjugate gradient method or an incomplete Cholesky conjugate gradient (ICCG) method may be used.

(Modification 1-1)

As another modification to the first exemplary embodiment, as a method for extracting an erroneous association point, the erroneous association point can be extracted by previously calculating a shadow direction in which a shadow can be generated for each of edge points on a three-dimensional model in an approximate position and orientation and determining the shadow direction together with information about the shadow direction.

More specifically, the shadow direction calculation unit 206 first calculates the shadow direction. A method for calculating the shadow direction is similar to that in step S303, described above. The erroneous association point detection unit 207 then calculates a direction normal to an edge direction for each of the edge points on the three-dimensional model. The edge direction means a travel direction of each of line segments constituting the three-dimensional model. More specifically, each of the edge points on the three-dimensional model is projected onto a two-dimensional plane. The direction normal to the edge direction for each of the projected edge points on the three-dimensional model is acquired. While the direction normal to the edge direction can be classified into a direction toward the inside of the three-dimensional model and a direction toward the outside of the three-dimensional model. However, the normal direction toward the outside is calculated as a direction in which a shadow can be generated in the modification. Then, an inner product of the normal direction and the shadow direction is calculated for each of the edge points, to determine whether the edge point is the erroneous association point. It is determined that the edge point for which the inner product is a predetermined value or more is the erroneous association point. When the inner product is larger, it indicates that the shadow direction and the normal direction are closer. Therefore, the edge points to be linked to each other in the directions may be erroneously associated with each other. In the modification, the subsequent processing method is similar to that in the first exemplary embodiment.

(Modification 1-2)

In the first exemplary embodiment, it is assumed that the approximate position and orientation acquisition unit 203 acquires any approximate position and orientation every time calculation for obtaining the position and orientation of the measurement target object 101 is performed, and the shadow direction calculation unit 206 needs to newly calculates the shadow direction every time the calculation is performed. On the other hand, if several positions and orientations of the measurement target object 101 are determined depending on a shape and an arrangement method of the measurement target object, edge points that may be erroneously associated with each other for the approximate position and orientation previously assumed can be extracted.

More specifically, steps S301 to S304 are repeated for approximate positions and orientations previously assumed, and information about an erroneous association point is stored while being linked to each of the approximate positions and orientations. Then, calculation processing (from step S501 to step S506) for calculating a position and orientation of the measurement target object 101 is executed using a grayscale image acquired by the measurement information acquisition unit 201 and information about the approximate position and orientation. At this time, the above described approximate positions and orientations previously assumed are set in step S501, and the erroneous association point stored while being linked to each of the approximate positions and orientations is called in step S502. In this modification, the processes from step S301 to step S304 may be performed only once for each of the approximate positions and orientations. Therefore, a period of time for calculation processing can be made shorter than that when calculation is performed each time.

In the first exemplary embodiment, the erroneous association point is extracted for the edge point that has been calculated for the three-dimensional model in step S302.

A second exemplary embodiment of the present invention differs from the first exemplary embodiment in that an erroneous association point is extracted for an edge that has been detected for a grayscale image in step S302. As a method for extracting an erroneous association point, it is determined whether an edge point is an erroneous association point using the edge point and information about a luminance value at a pixel in its neighborhood.

Figure 9A:
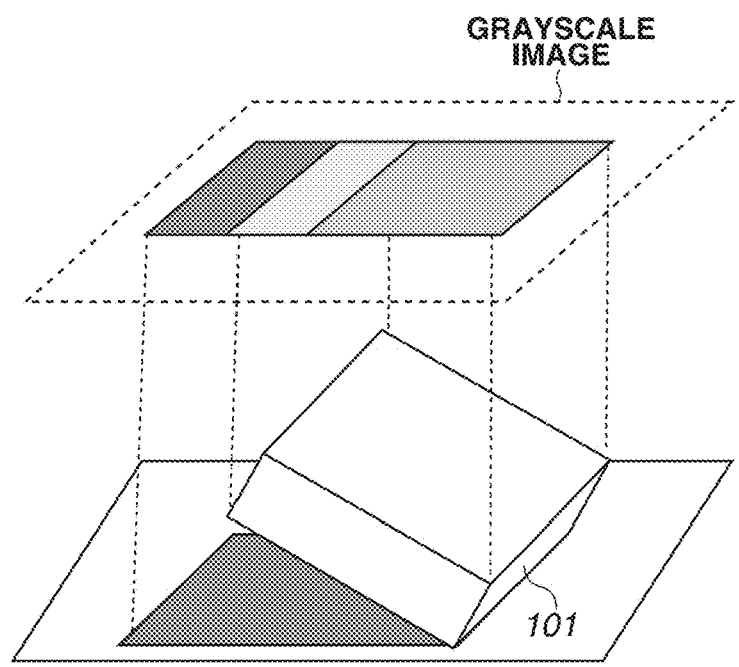
FIG. 9A is a conceptual diagram illustrating a relationship between a grayscale image obtained by capturing a measurement target object and the measurement target object according to the second exemplary embodiment.
Figure 9B:
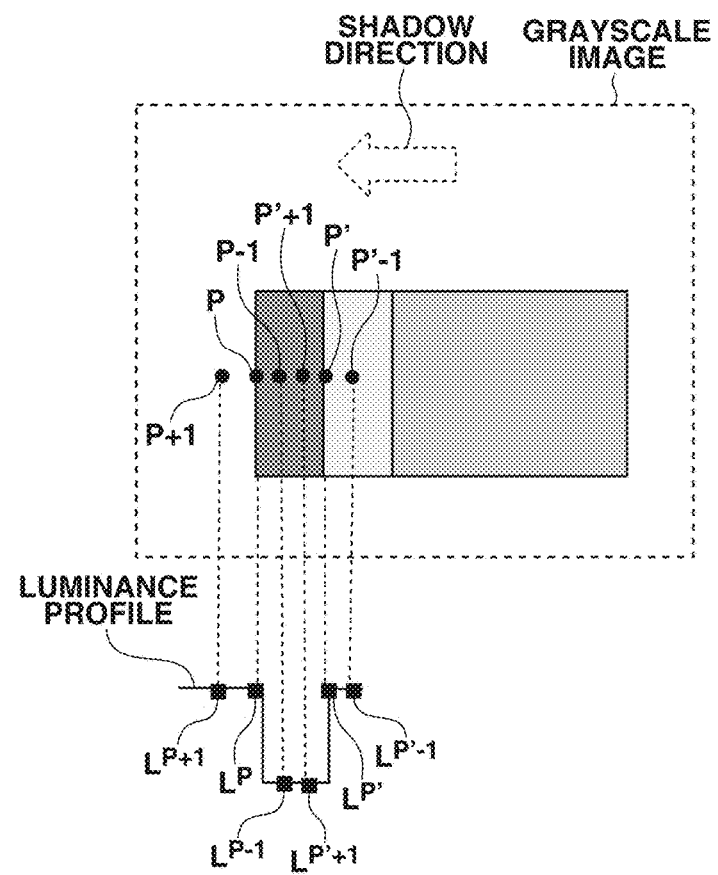
FIG. 9B illustrates a luminance value at each pixel in the neighborhood of an edge point in the grayscale image according to the second exemplary embodiment.

FIGS. 9A and 9B are respectively conceptual diagrams illustrating, for a grayscale image acquired by capturing a measurement target object 101 in a position and orientation, a relationship between the position and orientation of the measurement target object 101 and how the acquired grayscale image looks, and a relationship between the grayscale image and a luminance value profile. If the image capturing apparatus 102 captures the measurement target object 101 in the position and orientation thereof, as illustrated in FIG. 9A, an edge based on a shadow is reflected in addition to an edge of the measurement target object 101 in an acquired grayscale image. In the neighborhood of the edge based on the shadow, a luminance value changes to decrease once along a shadow direction, and then increase.

If a grayscale image, as illustrated in FIG. 9B, is obtained, and an edge point P derived from a shadow among edge points extracted from the grayscale image is focused on, for example, respective luminance values $L^{P+1}$ and $L^{P-1}$ at pixels P+1 and P−1 in its neighborhood in a shadow direction increase in the shadow direction with a luminance value $L^P$ of the edge point P as a boundary. At this time, respective luminance values $L^{P'+1}$ and $L^{P'-1}$ at pixels P'+1 and P'−1 in the neighborhood in the shadow direction of an edge point P' derived from the measurement target object 101 existing in the neighborhood of the edge point P decrease in the shadow direction with a luminance value $L^{P'}$ of the edge point P' as a boundary. If a portion in the neighborhood of the edge point P is viewed on the grayscale image, the portion seems to be changing to "bright", "dark", and "bright" in this order in the shadow direction. Specifically, when the change in the luminance value in the shadow direction in the neighborhood of the focused edge point in the grayscale image from step S802 to step S805 is referred to, it can be determined whether the edge point is derived from the shadow.

A procedure for position and orientation calculation processing in the present exemplary embodiment will be described below.

While measurement information, apparatus information, approximate position and orientation, and model information are first acquired, and an edge is then detected, a series of methods are similar to those according to the first exemplary embodiment, and hence description thereof is not repeated.

Figure 12:
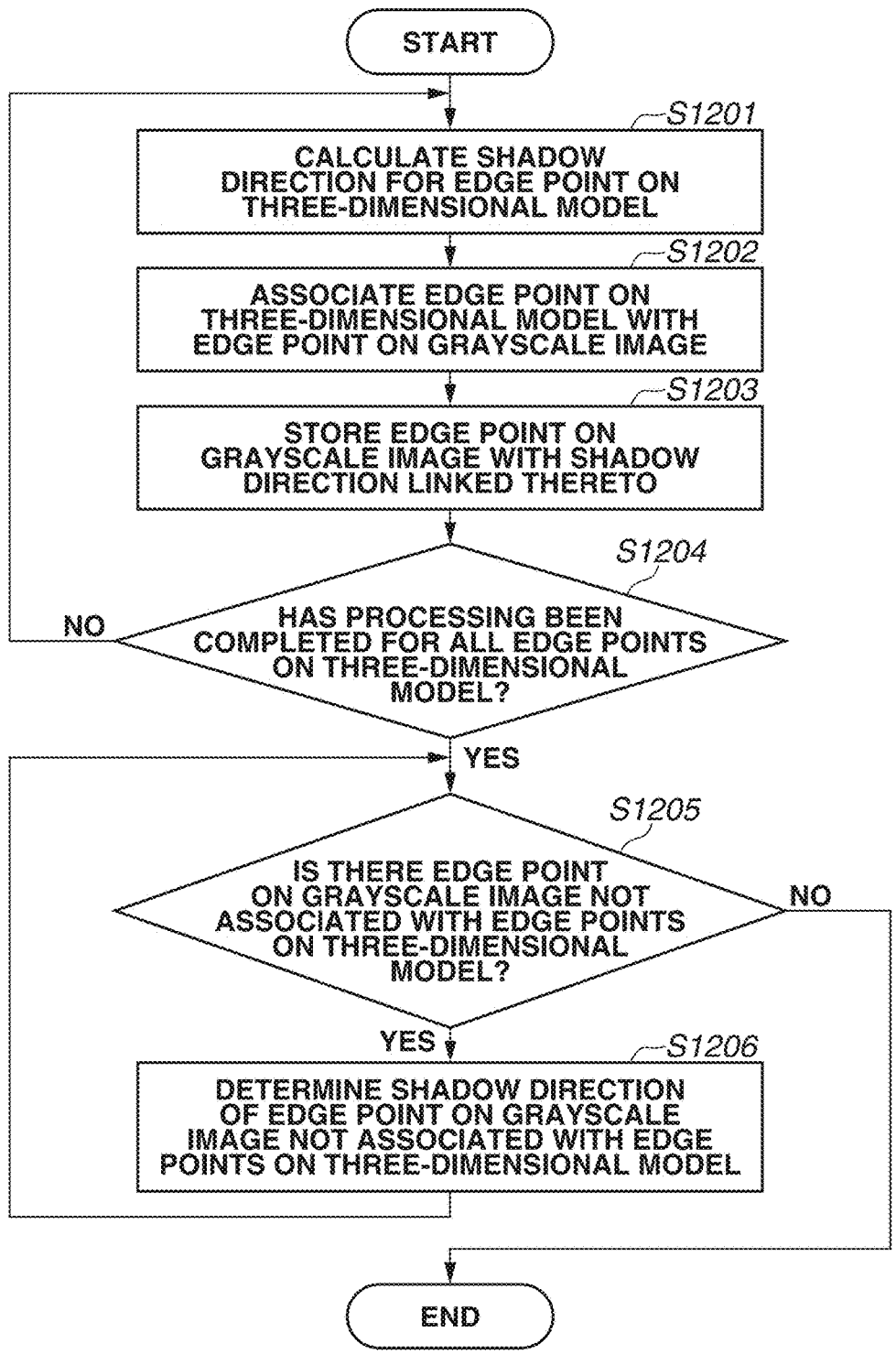
FIG. 12 is a flowchart illustrating a specific procedure for shadow direction calculation processing according to the second exemplary embodiment.

A shadow direction is then calculated. FIG. 12 is a flowchart illustrating a procedure for shadow direction calculation processing according to the present exemplary embodiment. Each of steps illustrated in FIG. 12 will be described below.

In step S1201, a shadow direction calculation unit 206 first calculates a shadow direction for an edge point on a three-dimensional model. A method for calculating the shadow direction in step S1201 is similar to that in step S303 in the first exemplary embodiment. The calculated shadow direction is stored while being linked to the edge point on the three-dimensional model.

In step S1202, the shadow direction calculation unit 206 then associates the edge point on the three-dimensional model for which the shadow direction has been calculated with an edge point on a grayscale image. A method for the association in step S1201 is similar to that in step S503 in the first exemplary embodiment.

In step S1203, the shadow direction calculation unit 206 then stores the edge point on the grayscale image, which has been associated with the edge point on the three-dimensional model in step S1202, with the shadow direction, which has been calculated in step S1201, linked thereto.

In step S1204, the shadow direction calculation unit 206 then checks whether processes from step S1201 to step S1203 are completed for all edge points on the three-dimensional model. If the processes are completed for all the edge points on the three-dimensional model (YES in step S1204), the processing proceeds to step S1205. On the other hand, if the edge point on the three-dimensional model, which has not yet been processed, exists, the processes from step S1201 to step 1204 are repeated.

In step S1205, the shadow direction calculation unit 206 then determines whether the edge point on the grayscale image, which has not been associated with the edge point on the three-dimensional model, remains. If the edge point does not remain (NO in step S1205), the subsequent processes are omitted, and the processing for the shadow calculation ends. If the edge point remains (YES in step S1205), the processing proceeds to step S1206.

In step S1206, the shadow direction calculation unit 206 determines the shadow direction of the edge point on the grayscale image, which has not been associated with the edge point on the three-dimensional model, by referring to information about the shadow direction of the edge point in its neighborhood that has already been associated with the edge point on the three-dimensional model. As a method for determining the shadow direction, the shadow direction may be determined as a shadow direction linked to the nearest edge point in the neighborhood among the edge points that have already been associated with the edge points on the three-dimensional model, for example. If the plurality of edge points, which has been associated with the edge points on the three-dimensional model, exists in a predetermined area in its neighborhood, the shadow direction may be determined as an average value of shadow directions linked to the edge points. After the shadow direction is determined in step S1206, the processing returns to step S1205.

The shadow direction calculation unit 206 calculates the shadow direction by executing the above-described processes.

Figure 8:
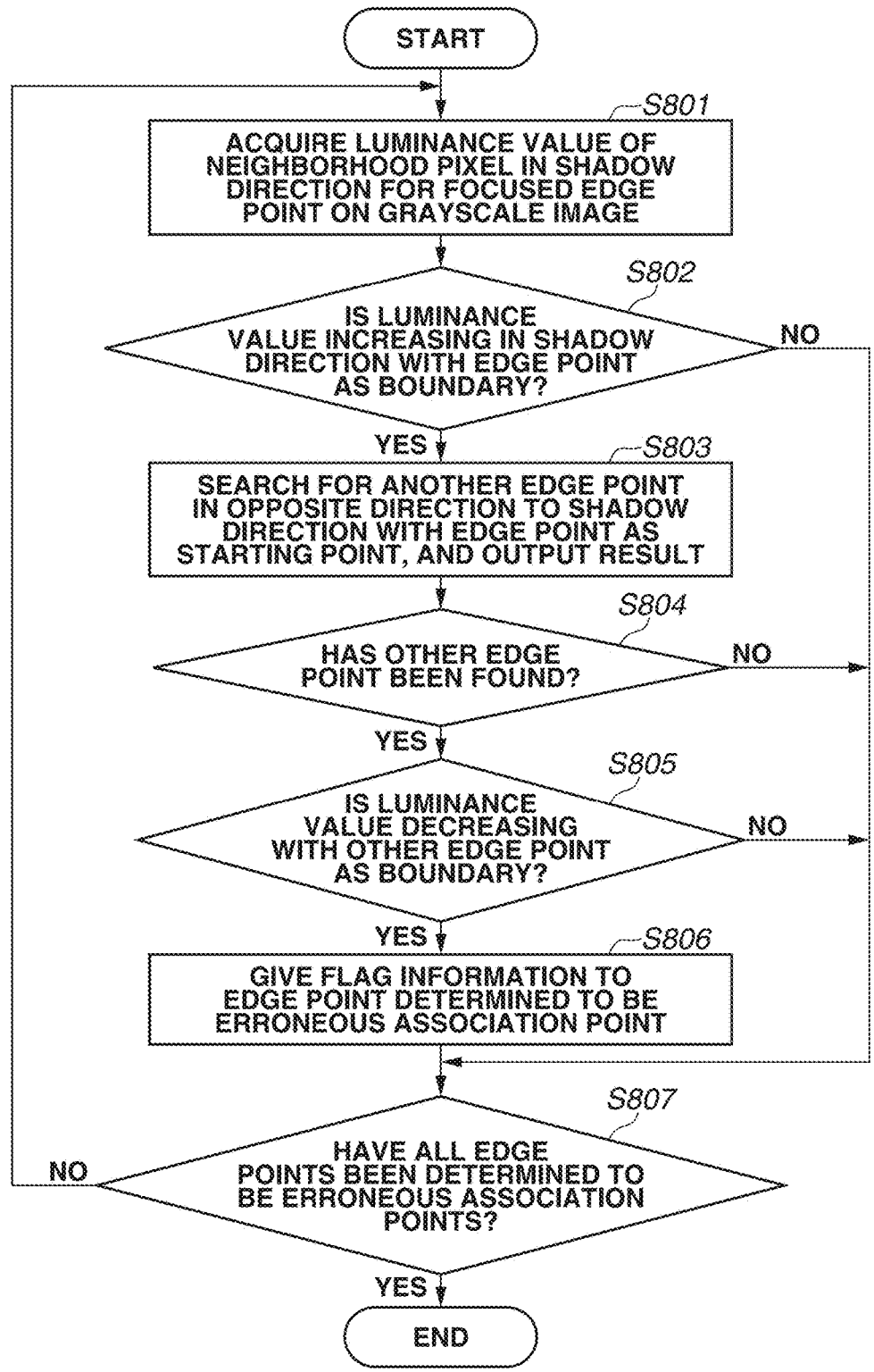
FIG. 8 is a flowchart illustrating a specific procedure for erroneous association point detection processing according to the second exemplary embodiment.

The erroneous association point is then extracted. FIG. 8 is a flowchart illustrating a procedure for erroneous association point extraction processing in the present exemplary embodiment. Each of steps illustrated in FIG. 8 will be described below.

In step S801, an erroneous association point detection unit 207 first searches for pixels in the neighborhood (in the periphery) in a shadow direction of a focused edge point in a grayscale image, and acquires their luminance values (pixel values). The grayscale image to be used may be the same as that used for the position and orientation calculation of the three-dimensional model in the first exemplary embodiment.

In step S802, the erroneous association point detection unit 207 then determines whether the acquired luminance value is increasing in the shadow direction with the focused edge point as a boundary. Specifically, if a luminance profile, as illustrated in FIG. 9B, is obtained, the erroneous association point detection unit 207 compares luminance values $L^{P+1}$ and $L^{P-1}$ corresponding to pixels P+1 and P−1 existing in the neighborhood in the shadow direction of an focused edge point P with each other, and determines whether the luminance values $L^{P+1}$ and $L^{P-1}$ have a relationship of $L^{P+1}>L^{P-1}$. If the luminance value is increasing as a result of the determination (YES in step S802), the focused edge point P is set as a candidate to an erroneous association point, and the processing proceeds to step S803. Otherwise (NO in step S802), processes from step S803 to step S806 are omitted, and the processing proceeds to step S807.

In step S803, the erroneous association point detection unit 207 searches for another edge point in a direction opposite to the shadow direction with the focused edge point P as a starting point, and outputs a result of the search. More specifically, the erroneous association point detection unit 207 searches for the other edge point in a direction opposite to the shadow direction with the edge point P illustrated in FIG. 9B as a starting point, and newly gives, if the edge point searched for is an edge point P', flag information thereto and outputs the edge point.

In step S804, the erroneous association point detection unit 207 refers to a result of the search in step S803, and determines whether the other edge point has been found. If it is determined that the other edge point has been found (YES in step S804), the erroneous association point detection unit 207 acquires a luminance value at a pixel in the neighborhood in the shadow direction of the edge point P', and the processing proceeds to step S805. If the other edge point has not been found in the neighborhood of the edge point P (NO in step S804), it is determined that the focused edge point P is excluded from a candidate to an erroneous association point. In this case, processes in steps S805 and S806 are omitted, and the processing proceeds to step S807.

In step S805, the erroneous association point detection unit 207 determines whether the acquired luminance value is decreasing in the shadow direction with the other edge point, which has been found in step S803, as a boundary. Specifically, the erroneous association point detection unit 207 compares luminance values $L^{P'+1}$ and $L^{P'-1}$ corresponding to pixels P'+1 and P'−1 existing in the neighborhood in the shadow direction of the edge point P' illustrated in FIG. 9B with each other, and determines whether the luminance values $L^{P'+1}$ and $L^{P'-1}$ have a relationship of $L^{P'+1}>L^{P'-1}$. If the luminance value is decreasing as a result of the determination (YES in step S805), the edge point P' is set as an erroneous association point, and the processing proceeds to step S806. Otherwise (NO in step S805), it is determined that the focused edge point P' is excluded from a candidate to an erroneous association point, and the processing proceeds to step S807.

In step S806, the erroneous association point detection unit 207 newly gives flag information to an edge point that has been determined to be the erroneous association point in step S805. A processing content in step S806 is similar to that in step S405 in the first exemplary embodiment.

In step S807, the erroneous association point detection unit 207 checks whether all the edge points have been determined to be erroneous association points. If all the edge points have been determined to be the erroneous association points (YES in step S807), the erroneous association point detection unit 207 ends the processing for erroneous association point extraction, and proceeds to processing for position and orientation calculation. On the other hand, if the edge point, which has not yet been determined, exists (NO in step S807), the processing proceeds to step S801, and the processes from step S801 to step 807 are repeated. A processing content in step S807 is similar to that in step S406 in the first exemplary embodiment.

When the above-described processes are executed, the erroneous association point is extracted.

A position and orientation is then calculated. A method for calculating a position and orientation is similar to the method illustrated in the first exemplary embodiment, and hence description thereof is not repeated.

When the above-described processes are executed, the position and orientation of the measurement target object 101 can be calculated.

(Modification 2-1)

In the present exemplary embodiment, it is determined whether an edge point on a grayscale image associated with an edge point on a three-dimensional model is an erroneous association point. If it is determined that the edge point on the grayscale image is the erroneous association point, processing for reflecting the erroneous association point on subsequent position and orientation calculations is performed, like in the first exemplary embodiment. As a modification in position and orientation calculation, a method for not reflecting an erroneous association point on a grayscale image on subsequent calculation but associating the erroneous association point with an edge point on a three-dimensional model, and replacing, when the erroneous association point on the grayscale image is associated with the edge point on the three-dimensional model, the erroneous association point with another edge point in its neighborhood may be used.

Figure 14:
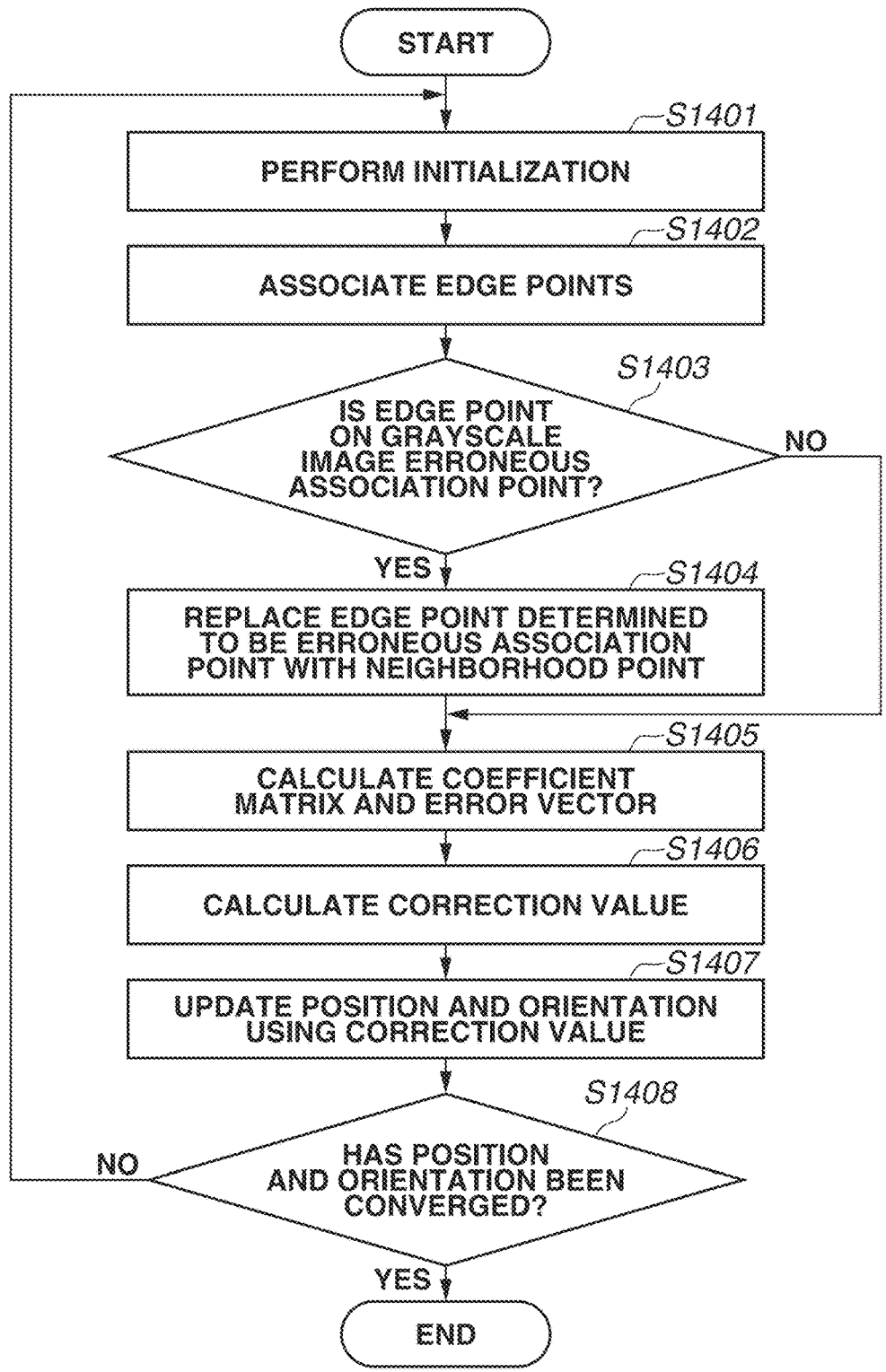
FIG. 14 is a flowchart illustrating a specific procedure for position and orientation calculation processing according to a modification example 2-1.

FIG. 14 is a flowchart illustrating a procedure for position and orientation calculation processing in this modification. While respective processing contents in steps S1401 and S1402 illustrated in FIG. 14 are similar to those in steps S501 and S503 in the first exemplary embodiment and the second exemplary embodiment, edge points on a grayscale image, which are associated with edge points on a three-dimensional model in step S1402, include an erroneous association point. In step S1403, it is determined whether the edge point on the grayscale image, which has been associated with the edge point on the three-dimensional model in step S1402, is the erroneous association point. If it is determined that the edge point is the erroneous association point (YES in step S1403), then in step S1404, the erroneous association point is replaced with a neighborhood point.

The neighborhood point, with which the erroneous association point is replaced in step S1404, needs to be an edge point other than the erroneous association point. A specific example is preferably an edge point existing in a direction opposite to a shadow direction that has been searched for in step S803, as the edge point may be a point derived from an edge of the measurement target object 101.

Processing contents in the subsequent steps S1405 to S1408 are similar to those from step S504 to step S507 in the first exemplary embodiment and the second exemplary embodiment. In this modification, when the associated erroneous association point is used for subsequent calculation after being replaced with another edge that may be derived from the measurement target object 101, the erroneous association can be prevented.

In the first exemplary embodiment, the erroneous association point is extracted for the edge point on the three-dimensional model. On the other hand, in the second exemplary embodiment, the erroneous association point is extracted for the edge point on the grayscale image that has been acquired in the measurement information acquisition unit 201. On the other hand, in a third exemplary embodiment of the present invention, position and orientation calculation is performed after an erroneous association point is extracted for each of an edge point on a three-dimensional model and an edge point on a grayscale image. In the present exemplary embodiment, respective issues that may occur in the first exemplary embodiment and the second exemplary embodiment can be compensated for each other by combining the first and second exemplary embodiments.

In the first exemplary embodiment, the point, which may be erroneously associated with the edge derived from the shadow, is extracted for the edge point on the three-dimensional model. In this method, calculation is performed on the premise that the measurement target object 101 has an ideal shape, like the three-dimensional model, in a virtual three-dimensional space, and a relative positional relationship between the image capturing apparatus 102 and the projection apparatus 103 is an ideal arrangement. However, a situation where image capturing is actually performed is not necessarily ideal. Even if the edge point on the three-dimensional model is extracted as the erroneous association point, the edge derived from the shadow may not exist in the neighborhood of the edge point on the grayscale image associated with the erroneous association point due to a shape error of the measurement target object 101 and an error of the positional relationship between the image capturing apparatus 102 and the projection apparatus 103. More specifically, in such a case, an edge point, with which there is no problem even when used for position and orientation calculation, is excessively excluded. Accordingly, such an issue can be solved by newly adding processing for determining whether the erroneous association point extracted for the edge point on the three-dimensional model is included in the erroneous association point extracted from information about the grayscale image acquired by actually performing image capturing.

On the other hand, in the second exemplary embodiment, the luminance value is referred to for the edge point on the grayscale image, and the edge point derived from the shadow is extracted. In this method, it is determined whether, for each of all the extracted edge points, the luminance of the pixel in its neighborhood satisfies a condition "bright, dark, bright". Therefore, the edge point not derived from the shadow may also be inactivated depending on the material and shape and the position and orientation of the measurement target object 101. In this case, the number of the edge points used for the position and orientation calculation is reduced. Therefore, the accuracy of the position and orientation calculation may deteriorate. Accordingly, such an issue can be solved by newly adding processing for determining whether the erroneous association point extracted for the edge point on the grayscale image is included in the erroneous association points extracted from the three-dimensional model and information about the approximate position and orientation.

A method for position and orientation calculation according to the third exemplary embodiment will be described below. FIG. 10 is a flowchart illustrating a procedure for position and orientation calculation processing in the present exemplary embodiment. Both steps S1003 and S1004 are steps of extracting an erroneous association point, and correspond to step S304 in the first exemplary embodiment, the second exemplary embodiment, and the modifications thereto. However, an erroneous association point is extracted for a three-dimensional model in step S1003 while the erroneous association point is extracted for a grayscale image in step S1004. Steps S1003 and S1004 may be executed in parallel. Alternatively, after either one of steps S1003 and S1004 is executed, the other step may be extracted. In step S1005, the position and orientation calculation is performed after information about the extracted erroneous association point is reflected thereon. However, the present exemplary embodiment differs from the first and second exemplary embodiments in that erroneous association points respectively extracted from both an edge point on the three-dimensional model and an edge point on the grayscale image are used.

FIG. 11 is a flowchart illustrating a procedure for specific processing of step S1005 according to the present exemplary embodiment. Steps illustrated in FIG. 11 will be described below.

In step S1101, a position and orientation calculation unit 208 performs initialization. The present exemplary embodiment is similar to the first and second exemplary embodiments in that information about an approximate position and orientation and information about an edge point are extracted. However, the present exemplary embodiment differs from the other exemplary embodiments in that both an erroneous association point extracted for an edge point on a three-dimensional model and an erroneous association point extracted for an edge point on a grayscale image are acquired.

In step S1102, the position and orientation calculation unit 208 compares positions of the erroneous association point extracted from the edge point on the three-dimensional model and the erroneous association point extracted from the edge point on the grayscale image, and determines whether the positions of the erroneous association points match each other on an image plane. Even when the positions of the two types of erroneous association points do not completely match each other, if a distance between the focused edge points is within an allowable range, the points may be considered to match each other. In this case, the allowable range of the distance between the edge points needs to be previously set, and a step for calculating the distance between the edge points needs to be separately provided. If it is determined that the two types of erroneous association points match each other (YES in step S1102), the processing proceeds to step S1103. Otherwise (NO in step S1102), it is determined that the edge point is not the erroneous association point, and the processing proceeds to step S1104.

In step S1103, the position and orientation calculation unit 208 performs processing for reflecting the erroneous association points, which have matched each other in step S1102, on subsequent calculation. While the erroneous association points for both the edge point on the three-dimensional model and the edge point on the grayscale image are to be reflected, processing for reflecting the erroneous association point for either one of the edge points may be used if reflection on one of the edge points has a sufficient effect on a result of the position and orientation calculation.

Processes from step S1104 to step S1108 are similar to those from step S503 to step S507 in the first and second exemplary embodiments, and hence description thereof is not repeated.

(Modification 3-1)

While the detection of the erroneous association point for the edge point on the three-dimensional model and the detection of the erroneous association point for the edge point on the grayscale image are independently performed in the present exemplary embodiment, the erroneous association points need not necessarily independently detected to shorten a processing time. For example, after either one of the erroneous association points is previously detected, association is performed. As long as an edge point associated with the erroneous association point exists as a result of the association, it may be determined whether the edge point is the erroneous association point. In this modification, it need not be determined whether the two erroneous association points match each other. Therefore, an effect of shortening the processing time can be expected.

<Effect of Each Exemplary Embodiment>

In the first exemplary embodiment, the stability of the position and orientation measurement is improved by determining whether the edge point on the three-dimensional model may be erroneously associated with the edge derived from the shadow using the information about the direction in which the shadow is generated and the approximate position and orientation and reflecting the information about the erroneous association point on the position and orientation calculation, enabling the position and orientation measurement having high robustness.

In the second exemplary embodiment, the stability of the position and orientation measurement is improved by determining whether the edge point on the grayscale image is the edge derived from the shadow using the information about the direction in which the shadow is generated and the luminance value and reflecting the information about the erroneous association point on the position and orientation calculation, enabling position and orientation measurement having high robustness.

In the third exemplary embodiment, the stability of position and orientation measurement is improved by determining whether the erroneous association points respectively extracted for the edge point on the three-dimensional model and the edge point on the grayscale image match each other and reflecting the erroneous association points on the position and orientation calculation, enabling position and orientation measurement having high robustness.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present specification, even if an image including an object includes a shadow, a position and orientation of the object can be measured with high accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-076076, filed Apr. 2, 2015, which is hereby incorporated by reference herein in its entirety.

What is claimed is:

1. An information processing apparatus comprising:
an acquisition unit configured to acquire an image, including a measurement target object, captured by an image capturing apparatus;
a storage unit configured to store information about a plurality of geometric features constituting a three-dimensional model of the measurement target object;
a setting unit configured to set, in a case where the plurality of geometric features is associated with a plurality of image features in the image, a flag for the geometric feature that may correspond to the image feature caused by a shadow of the measurement target object;

an association unit configured to associate the plurality of geometric features with the plurality of image features detected from the image, based on an approximate position and orientation of the measurement target object and the flag set by the setting unit; and a derivation unit configured to derive a position and orientation of the measurement target object based on a result of the association by the association unit.

2. The information processing apparatus according to claim 1, wherein the setting unit determines, among the plurality of geometric features, the geometric feature that may correspond to the image feature caused by the shadow of the measurement target object, based on the approximate position and orientation of the measurement target object, and sets the flag for the geometric feature that may correspond to the image feature caused by the shadow.

3. The information processing apparatus according to claim 1, wherein the derivation unit updates the approximate position and orientation so that a difference between the image feature and the geometric feature, which are associated with each other, is reduced, to derive the position and orientation of the measurement target object.

4. The information processing apparatus according to claim 1, further comprising a second setting unit configured to set, among the plurality of image features detected from the image, a second flag for the image feature that may be caused by the shadow of the measurement target object, wherein the association unit further associates the plurality of geometric features and the plurality of image features with each other based on the second flag.

5. The information processing apparatus according to claim 1, wherein the association unit does not associate the geometric feature for which the flag is set with the image feature.

6. The information processing apparatus according to claim 1, further comprising an estimation unit configured to estimate a direction of the shadow of the measurement target object in the image based on a position of the image capturing apparatus and a position of a projection apparatus that projects light onto the measurement target object, wherein the setting unit sets the flag based on the approximate position and orientation of the measurement target object and the direction of the shadow.

7. The information processing apparatus according to claim 6, wherein the setting unit projects the plurality of geometric features onto a two-dimensional plane based on the approximate position and orientation, determines, as a result of searching a predetermined range in the direction of the shadow, starting at a focused geometric feature among the plurality of projected geometric features, that the focused geometric feature may correspond to the image feature caused by the shadow of the measurement target object if the geometric feature other than the focused geometric feature is not detected, to set the flag.

8. The information processing apparatus according to claim 6, wherein the setting unit projects the plurality of geometric features arranged in a three-dimensional space onto a two-dimensional plane, based on the approximate position and orientation, determines, based on a direction of the focused geometric feature among the plurality of projected geometric features and the direction of the shadow on the two-dimensional plane, that the focused geometric feature may correspond to the image feature caused by the shadow of the measurement target object, to set the flag.

9. An information processing apparatus comprising:

an acquisition unit configured to acquire an image, including a measurement target object, captured by an image capturing apparatus;

a storage unit configured to store information about a plurality of geometric features constituting a three-dimensional model of the measurement target object;

a first setting unit configured to set, when the plurality of geometric features is associated with a plurality of image features in the image, a first flag for the geometric feature that may correspond to the image feature caused by a shadow of the measurement target object;

a second setting unit configured to set, among the plurality of image features detected from the image, a second flag for the image feature caused by the shadow of the measurement target object;

an association unit configured to associate the plurality of geometric features with the plurality of image features detected from the image, based on an approximate position and orientation of the measurement target object and the first flag and the second flag; and a derivation unit configured to derive a position and orientation of the measurement target object based on a result of the association by the association unit.

10. An information processing method comprising:

acquiring an image, including a measurement target object, captured by an image capturing apparatus;

setting, when a plurality of geometric features constituting a three-dimensional model of the measurement target object is associated with a plurality of image features in the image, a flag for the geometric feature that may correspond to the image feature caused by a shadow of the measurement target object;

associating the plurality of geometric features with the plurality of image features detected from the image, based on an approximate position and orientation of the measurement target object and the set flag; and deriving a position and orientation of the measurement target object based on a result of the association.

11. An information processing method comprising:

acquiring an image, including a measurement target object, captured by an image capturing apparatus;

setting, when a plurality of geometric features constituting a three-dimensional model of the measurement target object is associated with a plurality of image features in the image, a first flag for the geometric feature that may correspond to the image feature caused by a shadow of the measurement target object;

setting, among the plurality of image features detected from the image, a second flag for the image feature caused by the shadow of the measurement target object;

associating the plurality of geometric features with the plurality of image features detected from the image, based on an approximate position and orientation of the measurement target object and the first flag and the second flag; and deriving a position and orientation of the measurement target object based on a result of the association.

12. A computer-readable storage medium storing instructions that, when executed by a computer of an information processing apparatus, cause the computer to perform a method comprising:

acquiring an image, including a measurement target object, captured by an image capturing apparatus;

setting, when a plurality of geometric features constituting a three-dimensional model of the measurement target object is associated with a plurality of image features in the image, a flag for the geometric feature that may correspond to the image feature caused by a shadow of the measurement target object;

associating the plurality of geometric features with the plurality of image features detected from the image, based on an approximate position and orientation of the measurement target object and the set flag; and deriving a position and orientation of the measurement target object based on a result of the association.

13. A computer-readable storage medium storing instructions that, when executed by a computer of an information processing apparatus, cause the computer to perform a method comprising:

acquiring an image, including a measurement target object, captured by an image capturing apparatus;

setting, when a plurality of geometric features constituting a three-dimensional model of the measurement target object is associated with a plurality of image features in the image, a first flag for the geometric feature that may correspond to the image feature caused by a shadow of the measurement target object;

setting, among the plurality of image features detected from the image, a second flag for the image feature caused by the shadow of the measurement target object;

associating the plurality of geometric features with the plurality of image features detected from the image, based on an approximate position and orientation of the measurement target object and the first flag and the second flag; and deriving a position and orientation of the measurement target object based on a result of the association.

* * * * *